United States Patent
Ishikawa et al.

(10) Patent No.: US 9,829,706 B2
(45) Date of Patent: Nov. 28, 2017

(54) CONTROL APPARATUS, INFORMATION PROCESSING APPARATUS, CONTROL METHOD, INFORMATION PROCESSING METHOD, INFORMATION PROCESSING SYSTEM AND WEARABLE DEVICE

(71) Applicant: Sony Corporation, Tokyo (JP)

(72) Inventors: Hirotaka Ishikawa, Kanagawa (JP); Yasuki Kanema, Tokyo (JP); Satoshi Akagawa, Tokyo (JP)

(73) Assignee: Sony Corporation, Tokyo (JP)

( * ) Notice: Subject to any disclaimer, the term of this patent is extended or adjusted under 35 U.S.C. 154(b) by 178 days.

(21) Appl. No.: 14/620,288

(22) Filed: Feb. 12, 2015

(65) Prior Publication Data

US 2015/0243067 A1   Aug. 27, 2015

(30) Foreign Application Priority Data

Feb. 21, 2014   (JP) ................................. 2014-032266

(51) Int. Cl.
  *G06T 13/00* (2011.01)
  *G02B 27/01* (2006.01)
  *G06F 3/01* (2006.01)

(52) U.S. Cl.
  CPC .............. *G02B 27/017* (2013.01); *G06F 3/01* (2013.01); *G02B 2027/014* (2013.01)

(58) Field of Classification Search
  None
  See application file for complete search history.

(56) References Cited

U.S. PATENT DOCUMENTS

| | | | | |
|---|---|---|---|---|
| 2007/0176893 A1* | 8/2007 | Sato | ........................ | H04L 67/38 345/156 |
| 2010/0020185 A1* | 1/2010 | Sako | ...................... | H04N 7/181 348/211.1 |
| 2012/0154557 A1* | 6/2012 | Perez | ............... | H04N 21/25891 348/53 |
| 2013/0063362 A1* | 3/2013 | Papakipos | ............. | G06F 1/1626 345/173 |
| 2013/0307856 A1* | 11/2013 | Keane | ..................... | G10L 21/10 345/473 |

FOREIGN PATENT DOCUMENTS

JP   2013-141272 A   7/2013

* cited by examiner

*Primary Examiner* — Martin Mushambo
(74) *Attorney, Agent, or Firm* — Wolf, Greenfield & Sacks, P.C.

(57) ABSTRACT

A control apparatus includes a notification unit, a display controller, and a receiver. The notification unit is configured to notify an external apparatus of an operation event being input. The display controller is configured to, after the external apparatus is notified of the operation event, apply animation processing to a first image displayed on a display of a wearable device, during the time when the external apparatus is generating an image based on the operation event or when the external apparatus is sending the generated image. The receiver is configured to be capable of receiving a second image sent from the external apparatus, the second image being the image generated by the external apparatus.

20 Claims, 20 Drawing Sheets

CONTROL APPARATUS, INFORMATION PROCESSING APPARATUS, CONTROL METHOD, INFORMATION PROCESSING METHOD, INFORMATION PROCESSING SYSTEM AND WEARABLE DEVICE

CROSS REFERENCE TO RELATED APPLICATIONS

This application claims the benefit of Japanese Priority Patent Application JP 2014-032266 filed Feb. 21, 2014, the entire contents of which are incorporated herein by reference.

BACKGROUND

The present disclosure relates to control apparatuses, information processing apparatuses, information processing systems, control methods and information processing methods, which control wearable devices. The present disclosure also relates to the wearable devices.

A head mount display (HMD) which can be mounted on the head of a user and can show the user an image by a display to be placed in front of the user's eyes has been known.

The head mount display (imaging and displaying apparatus) described in the publication of Japanese Patent Application Laid-open No. 2013-141272 is configured to be capable of communicating to an external apparatus, and to display the image which was sent from the external apparatus (see, for example, paragraph [0023] of the specification of the publication).

SUMMARY

In cases where a wearable device communicates with an external apparatus, when communication delay arises, there arises a problem that displaying of an image may be delayed.

In view of the circumstances as described above, it is desirable to provide a wearable device capable of displaying an image in such a manner that an influence of communication delay is reduced; and to provide a control apparatus therefor, and the like.

According to an embodiment of the present disclosure, there is provided a control apparatus including a notification unit, a display controller, and a receiver.

The notification unit is configured to notify an external apparatus of an operation event being input.

The display controller is configured to, after the external apparatus is notified of the operation event, apply animation processing to a first image displayed on a display of a wearable device, during the time when the external apparatus is generating an image based on the operation event or when the external apparatus is sending the generated image.

The receiver is configured to be capable of receiving a second image sent from the external apparatus, the second image being the image generated by the external apparatus.

The display controller is configured to apply the animation processing to the currently displayed first image, when the external apparatus is generating or sending the image based on the notified operation event after the external apparatus is notified of that operation event. This may allow the control apparatus to cover the delay in image display due to the communication delay; and it makes it possible to provide easily viewable images with less stress to the user.

The display controller may be configured to display the second image on the display, the second image being received by the receiver. The display controller may be further configured to apply the animation processing to the second image.

The display controller may be configured to perform fade-out processing with respect to the first image. The display controller may be configured to, after performing the fade-out processing, perform fade-in processing with respect to the received second image.

With such fade-out and fade-in processing, the control apparatus is able to provide seamless switching of the images to the user.

The display controller may be configured to display a third image on the display, between displaying the first image and displaying the second image.

By inserting the third image between displaying the first image and displaying the second image, the control apparatus would be able to cover the communication delay. The time period of display of the third image may be variable. In this case, the displaying time may change depending on the communication delay time.

The display controller may be configured to, if a plurality of objects to express the second image is to be generated and sent by the external apparatus after the second image is generated by the external apparatus based on the operation event, apply animation processing to the second image, during the time when the plurality of objects is generated or when the plurality of objects is sent.

That is, the external apparatus sends the plurality of objects to the control apparatus while showing the user the animation; and thus the control apparatus is able to obtain the plurality of objects which is relatively large in capacity, without showing a state of display that gives the user stress.

Furthermore, by receiving the plurality of objects, it may also allow the control apparatus to execute processing for each of the objects after receiving them, so it makes it possible to deal with various kinds of application software.

The display controller may be configured to display on the display, as the first image, a first image in application software; and display on the display, as the second image, a second image in the application software which is different from the first image in the application software.

The display controller may be configured to display on the display, as the first image, an image in first application software; and display on the display, as the second image, an image in second application software, the second application software being different from the first application software.

The display controller may be configured to express a directionality of at least one of the first image and the second image, as the animation processing.

According to another embodiment of the present disclosure, there is provided an information processing apparatus to be provided in an apparatus configured to communicate with a control apparatus of a wearable device capable of displaying an image. The information processing apparatus includes a receiver, a generation unit, a transmission unit and an execution unit.

The receiver is configured to receive an operation event being notified by the control apparatus.

The generation unit is configured to generate an image based on the operation event.

The transmission unit is configured to send the generated image to the control apparatus.

The execution unit is configured to, after the operation event is issued, execute generating the image by the generation unit or execute sending the generated image by the transmission unit, during the time when the control apparatus is applying animation processing to an image displayed on the wearable device.

According to still another embodiment of the present disclosure, there is provided a control method including displaying a first image on a display of a wearable device.

An operation event which is input is notified to an external apparatus.

After the external apparatus is notified of the operation event, animation processing is applied to the first image displayed on the display, during the time when the external apparatus is generating a second image based on the operation event or when the external apparatus is sending the second image.

The second image which is generated by and sent from the external apparatus is received.

According to still another embodiment of the present disclosure, there is provided an information processing method including receiving an operation event being notified by a control apparatus of a wearable device capable of displaying an image.

After the notification of the operation event is made, a second image is generated based on the notified operation event, or, the second image is sent, during the time when the control apparatus is applying animation processing to a first image displayed on the wearable device.

The generated second image is sent to the control apparatus.

According to still another embodiment of the present disclosure, there is provided an information processing system including a control apparatus of a wearable device capable of displaying an image; and an external apparatus capable of communicating with the control apparatus.

The external apparatus includes a receiver, a generation unit and a transmission unit. The receiver is configured to receive an operation event being notified by the control apparatus. The generation unit is configured to generate an image based on the received operation event. The transmission unit is configured to send the generated image to the control apparatus.

The control apparatus includes a notification unit, a display controller, and a receiver. The notification unit is configured to notify the external apparatus of the operation event being input. The display controller is configured to, after the external apparatus is notified of the operation event, apply animation processing to a first image displayed on the wearable device, during the time when the generation unit is generating the image based on the operation event or when the transmission unit is sending the generated image. The receiver is configured to be capable of receiving a second image sent from the transmission unit, the second image being the image generated by the generation unit.

According to still another embodiment of the present disclosure, there is provided a wearable device including an operation unit, a display, a notification unit, a display controller and a receiver.

The operation unit is configured to receive an operation event being input.

The display is configured to display an image.

The notification unit is configured to notify an external apparatus of the operation event.

The display controller is configured to, after the external apparatus is notified of the operation event, apply animation processing to a first image displayed on the display, during the time when the external apparatus is generating an image based on the operation event or when the external apparatus is sending the generated image.

The receiver is configured to be capable of receiving a second image sent from the external apparatus, the second image being the image generated by the external apparatus.

According to still another embodiment of the present disclosure, there is provided a control apparatus including a notification unit, a receiver, a storage unit, a display controller and a controller.

The notification unit is configured to notify an external apparatus of an operation event being input.

The receiver is configured to receive an image sent from the external apparatus.

The storage unit is configured to store the received image.

The display controller is configured to, based on a coordinate system representing a place to position a plurality of images, allow the external apparatus to display at least one image out of the plurality of images.

The controller is configured to; if a first image is received by the receiver, the first image being sent from the external apparatus in accordance with the notification of the operation event, execute the following processing. That is, the controller is configured to display the first image by the display controller; and receive a second image sent from the external apparatus and store the received second image to the storage unit, the second image being adjacent to the first image on the coordinate system or positioned at a predetermined distance from the first image on the coordinate system.

According to still another embodiment of the present disclosure, there is provided an information processing apparatus to be provided in an apparatus configured to communicate with a control apparatus of a wearable device capable of displaying an image. The information processing apparatus includes a receiver, a transmission unit and a controller.

The receiver is configured to receive an operation event being notified by the control apparatus, the control apparatus being configured to, based on a coordinate system representing a place to position a plurality of images, allow the wearable device to display at least one image out of the plurality of images.

The transmission unit is configured to generate an image and send the generated image to the control apparatus.

The controller is configured to generate a first image based on the received operation event and send the first image by the transmission unit to the control apparatus; and send a second image by the transmission unit to the control apparatus, the second image being adjacent to the first image on the coordinate system or positioned at a predetermined distance from the first image on the coordinate system.

According to still another embodiment of the present disclosure, there is provided an information processing apparatus to be provided in an apparatus configured to communicate with an external apparatus, the external apparatus being configured to communicate with a control apparatus of a wearable device capable of displaying an image. The information processing apparatus includes a receiver, a transmission unit and a controller.

The receiver is configured to receive an operation event via the external apparatus, the operation event being notified by the control apparatus, the control apparatus being configured to, based on a coordinate system representing a place to position a plurality of images, allow the wearable device to display at least one image out of the plurality of images.

The transmission unit is configured to generate an image and send the generated image to the control apparatus via the external apparatus.

The controller is configured to generate a first image based on the received operation event and send the first image by the transmission unit to the control apparatus via the external apparatus; and send a second image by the transmission unit to the control apparatus via the external apparatus, the second image being adjacent to the first image on the coordinate system or positioned at a predetermined distance from the first image on the coordinate system.

As described above, according to the present disclosure, it is possible to control displaying of an image in such a manner that an influence of communication delay is reduced.

Note that the effect described here is not necessarily limited, but may be any of the effects described in the present disclosure.

These and other objects, features and advantages of the present disclosure will become more apparent in light of the following detailed description of best mode embodiment thereof, as illustrated in the accompanying drawings.

DETAILED DESCRIPTION OF EMBODIMENTS

Hereinafter, an embodiment of the present disclosure will be described with reference to the drawings.

1. First Embodiment

1) Overall Configuration of Information Processing System Using Wearable Device

Figure 1:
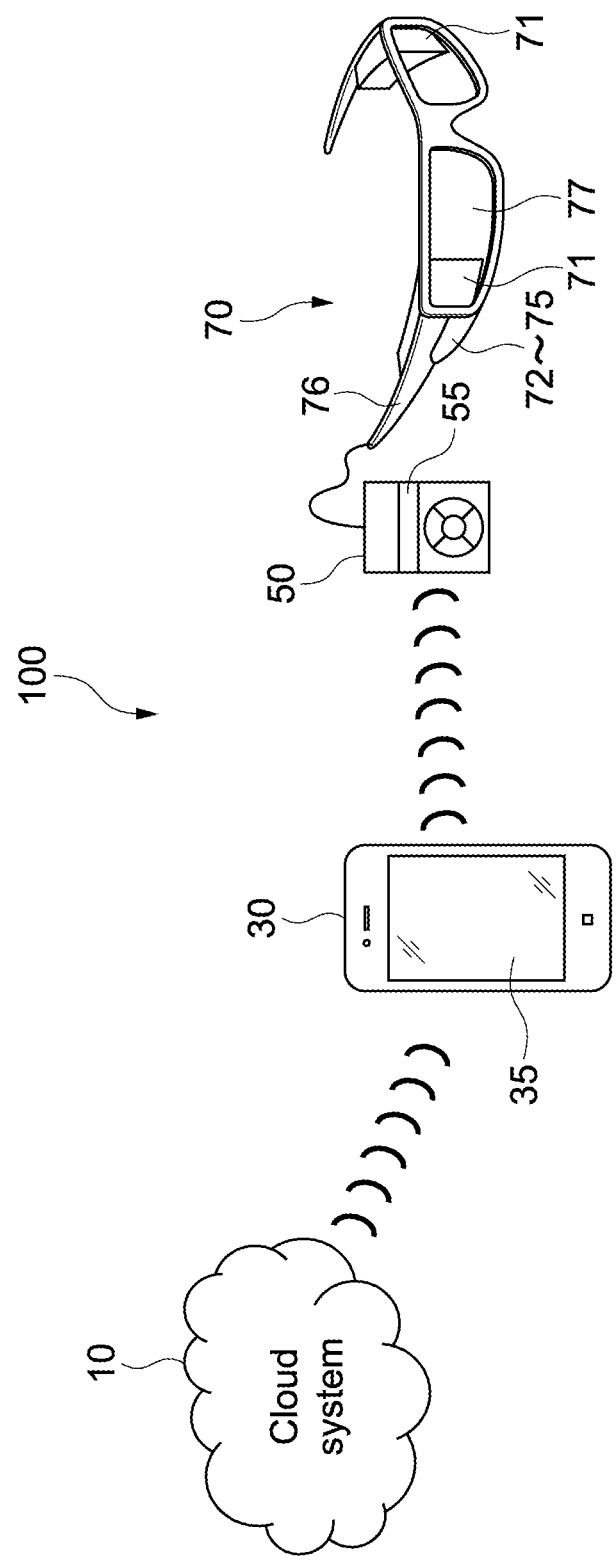
FIG. 1 shows a configuration of a system of a first embodiment, as an information processing system according to an embodiment of the present disclosure.

FIG. 1 shows a configuration of a system 100 of a first embodiment, as an information processing system according to an embodiment of the present disclosure.

This system 100 mainly includes a mobile terminal 30, a wearable device (wearable display) 70, and a control box 50 which functions as a control apparatus to control the wearable device 70.

The mobile terminal 30 functions as an information processing apparatus. Typically, the mobile terminal 30 may be a mobile phone such as a smartphone. The mobile terminal 30 may also be a tablet apparatus or other things such as a PC (Personal Computer).

The wearable device 70 is a head-mount type device as shown in the figure; but it is not limited thereto, and it may also be a wrist-band type or neck-band type device, for example.

The mobile terminal 30 is connectable to a cloud system 10. The cloud system 10 includes, for example, a server computer or the like being connected to an electric communication line network such as the Internet.

Typically, the control box 50 is connected to the wearable device 70 via wired connection. A user may operate the wearable device 70 by mounting the wearable device 70 on the head and operating the control box 50 with the fingers.

2) Configuration of Each Apparatus

Figure 2:
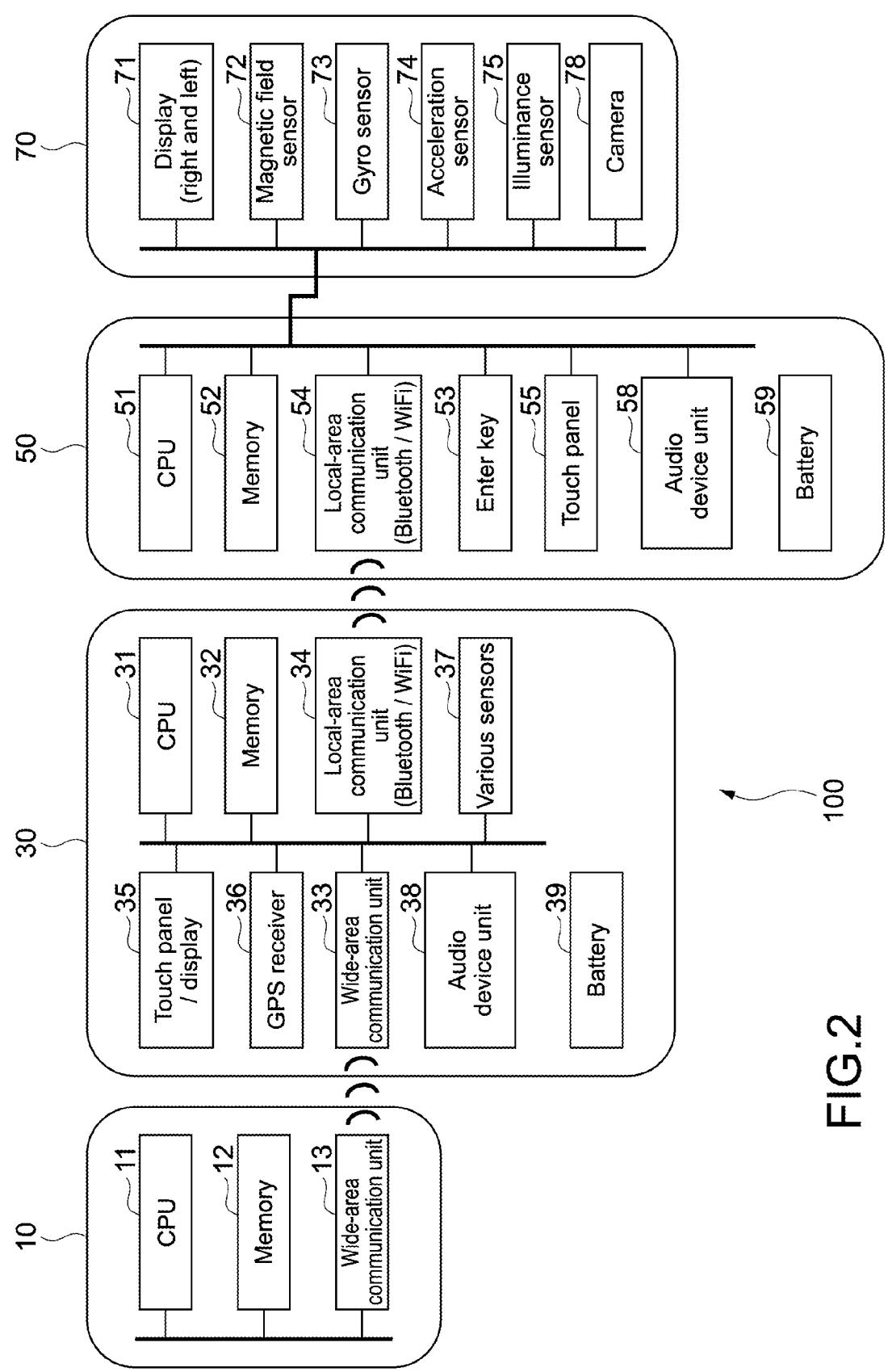
FIG. 2 is a block diagram showing a configuration of each apparatus of this system.

FIG. 2 is a block diagram showing a configuration of each apparatus of the system 100.

2-1) Mobile Terminal

The mobile terminal 30 (for example, smartphone) mainly includes a CPU (Central Processing Unit) 31, a memory 32, a touch panel/display 35, a wide-area communication unit 33 and a local-area communication unit 34. The mobile terminal 30 further includes various sensors 37 including a motion sensor, a camera, and the like; a GPS (Global Positioning System) receiver 36; an audio device unit 38; a battery 39; and the like. At least the mobile terminal 30 (or, the mobile terminal 30 and the cloud system 10) functions as an external apparatus with respect to the wearable apparatus 70.

The wide-area communication unit 33 is capable of performing communication using a communication system such as 3G (Third Generation) and LTE (Long Term Evolution), for example. The local-area communication unit 34 is capable of performing communication using a wireless LAN (Local Area Network) communication system such as WiFi; and/or a short-range wireless communication system such as Bluetooth (registered trademark) and infrared system; for example. The local-area communication unit 34 functions as a "receiver" and a "transmission unit" between the local-area communication unit 34 and the control box 50.

The mobile terminal 30 may also have an identifying communication device that uses a so-called near-field wireless communication system such as RFID (Radio Frequency IDentification), for example, independently from the local-area communication unit 34.

The audio device unit 38 includes a microphone and a speaker.

2-2) Wearable Device

The wearable device 70 has a display 71, various sensors 72 to 75, and a camera 78. The display 71 may include, for example, small-size projectors disposed on right and left sides of a frame 76 of the head-mount type wearable device 70. In this head-mount type wearable device 70, each image light projected from the corresponding projector, the image light being the same or having a parallax between the projectors, would be guided by a light-guiding plate 77. The guided image light would be projected from predetermined regions of the light-guiding plate 77 to the user's eyes.

Examples of the various sensors of the wearable device 70 include a magnetic field sensor 72, a gyro sensor 73, an acceleration sensor 74, an illuminance sensor and the like.

Note that it is also possible that the wearable device 70 has the display 71 only on one side of right and left. The wearable device 70 is not limited to the projector type device; and it may have another type of the display 71 which directly emits the image light to the eyes.

2-3) Control Box

The control box 50 includes a CPU 51, a memory 52, a local-area communication unit 54, an enter key 53, a touch panel 55, an audio device unit 58; a battery 59; and the like.

The CPU 51 totally controls each part in the control box 50 and the wearable device 70. The control box 50 may also have a PLD (Programmable Logic Device) such as a FPGA (Field Programmable Gate Array) instead of the CPU 51.

The local-area communication unit 54 is communicable with the local-area communication unit 34 of the mobile terminal 30 by the above-mentioned communication system. The local-area communication unit 54 functions as a "receiver", or a "transmission unit", between the local-area communication unit 54 and the mobile terminal 30.

The enter key 53 includes at least one physical key to be operated by the user, disposed on the control box 50. The enter key 53 includes, for example, a power key, a back key, an ON/OFF key of the display 71, and the like.

The touch panel 55 is an operating device to be operated by the user, disposed on a surface of the control box 50 (see FIG. 1).

The audio device unit 58 includes a microphone and a speaker.

The control box 50 may also have a communication device that uses the above-mentioned near-field wireless communication system such as RFID (Radio Frequency IDentification), for example, independently from the local-area communication unit 54. This may enable the user to perform pairing between the mobile terminal 30 close to the control box 50 in an almost automatic manner, by starting given application software in the mobile terminal 30 and bringing the mobile terminal 30 close to the control box 50.

Further, for example, it is also possible to make the mobile terminal 30 download and install the application software for the pairing, from the cloud, in an almost automatic manner, by the user's action of bringing the mobile terminal 30 close to the control box 50.

As a matter of course, even without such devices for near-field wireless communication, it is also possible that the control box 50 may be capable of performing the pairing with the mobile terminal 30 by using the local-area communication unit 54.

2-4) Cloud System

The server computer, for example, which is included in the cloud system 10, has a CPU 11; a memory 12; and a wide-area communication unit 13 configured to be communicable with the mobile terminal 30.

3) Software Configuration

Figure 3:
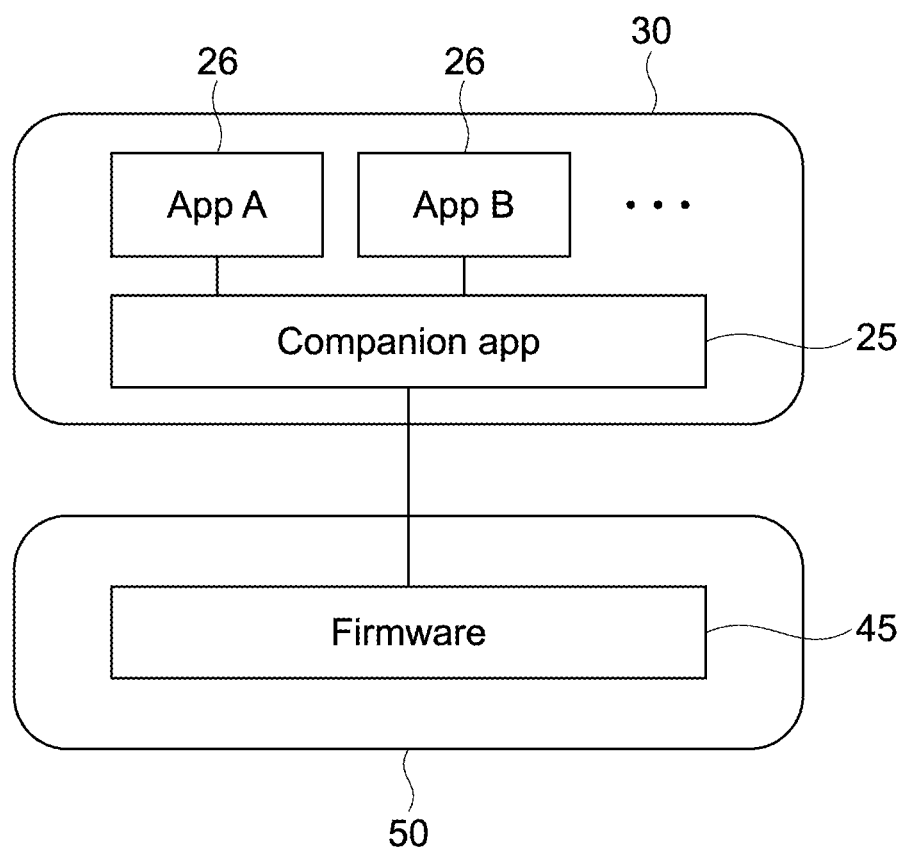
FIG. 3 shows configuration of software installed in each of a mobile terminal and a control box.

FIG. 3 shows configuration of software installed in each of the mobile terminal 30 and the control box 50.

The mobile terminal 30 stores common application software (hereinafter simply referred to as an "app") 26 and a companion app 25 in its memory 32. These apps 25 and 26 are configured to work on an OS (Operating System) that has been installed by default in the mobile terminal 30.

Examples of the kinds of the common apps 26 include a SNS (Social Networking Service) app for mini-blogs and community sites; a sound recognition app; a camera app; a media reproduction app; a news app; a weather forecast service app; and the like.

The companion app 25 has a function of converting default data and user data on these apps into data displayable on the display 71 of the wearable device 70. For example, by the mobile terminal 30 downloading the companion app 25 from the cloud system 10, the companion app 25 is installed to this mobile terminal 30.

The control box 50 has firmware 45 in its memory 52. The firmware 45 co-operates with the companion app 25 after the pairing. In the firmware 45, the camera app to operate the camera 78, a setting app for a setting screen which will be described later, and the like, are installed by default.

Figure 4:
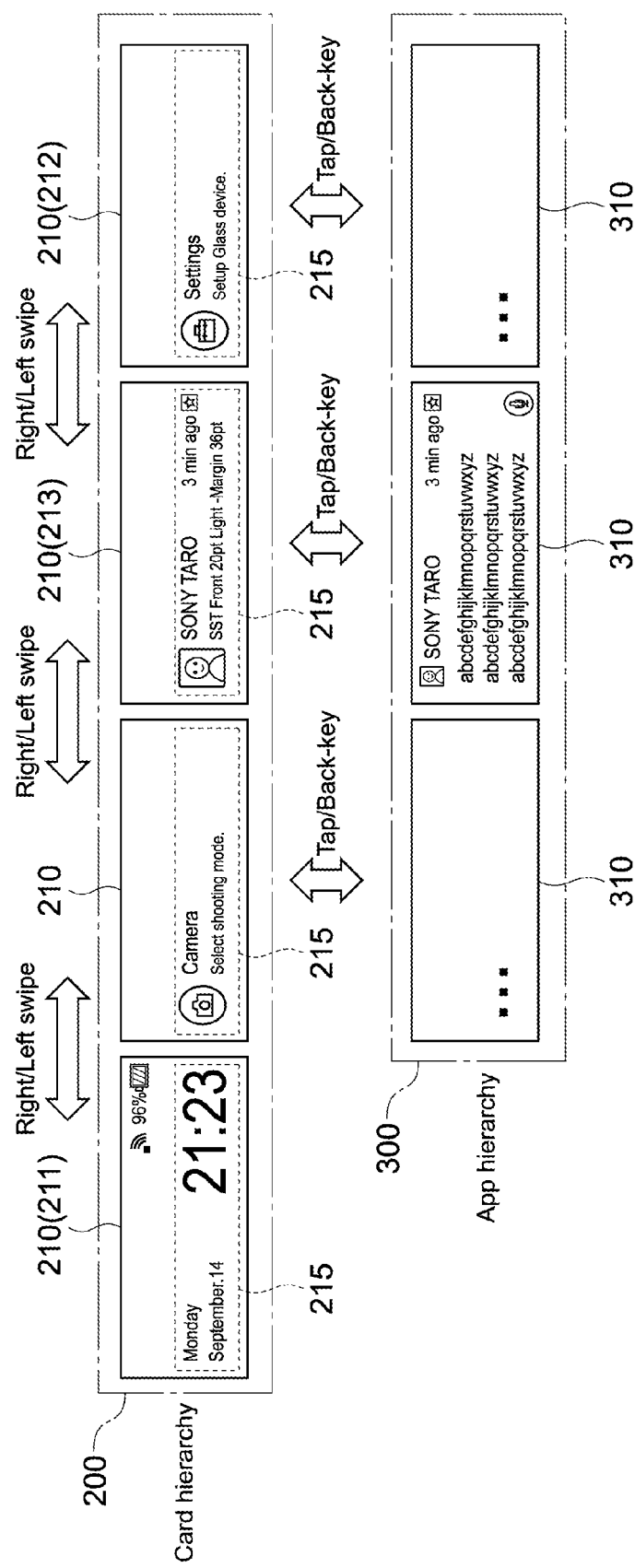
FIG. 4 shows an example of a screen displayed on a display of a wearable device.

4) Example of Screen Displayed by Wearable Device and Example of Operation of this System 4-1) Example of Screen Displayed on Wearable Device FIG. 4 shows an example of a screen displayed on the display 71 of the wearable device 70. Hereinafter, for convenience of explanation, the companion app 25 will be one that performs the processing of the mobile terminal 30; and the firmware 45 will be one that performs the processing of the control box 50.

4-1a) Example of Screen of Card Hierarchy

The hierarchy indicated in the upper row of FIG. 4 is referred to as a "card hierarchy". The card hierarchy 200 contains a variety of card screens 210 including, for example, a home screen 211, a setting screen 212, and the like, by default. The card hierarchy 200 contains in addition a card screen 210 (213) of the app 26 (see FIG. 3) registered by the user.

The card screens 210 contain images 215 which may be located mainly at the bottom half region among the entire region of the card screen, for example. A region occupied by one card screen 210 (and an app screen 310 which will be described later) will be a display region by the display 71. In the following description, an image in the region occupied by the card screen 210 will be referred to as a "card image". The card image (except for the card image of the home screen 211) as used in this context would be an image such as an icon, or widget, and this may be a GUI (Graphical User Interface) for accessing to an app. Each card screen 210 is provided with one card image.

The user is able to add the card images, especially the images 215, by registering them. For example, the user may use the mobile terminal 30 and perform an operation of registration to the app 26 installed in the mobile terminal 30, and thus the companion app 25 may generate the card image corresponding to this app 26.

The card image corresponding to the app is, for example, an image containing within the card image a mark and characters that make it recognizable as that app. As will be described later, basically, the companion app 25 stores the card images that it has generated by itself, to the memory 32. The firmware 45 also stores a given number of these card images, to the memory 52.

The firmware 45 in the control box 50 is configured to display these card screens 210 one by one on the display 71. In the same hierarchy, with an input of a swiping operation to right or left by the user via the touch panel 55, the firmware 45 displays each of these card screens 210 on the display 71 in order.

Note that the "Settings" that can be accessed from the setting screen 212 which is one of the card screens 210 also indicates one of the application software; which is a built-in default app in the control box 50.

4-1b) Example of Screen of App Hierarchy

The hierarchy indicated in the lower row of FIG. 4 is referred to as an "app hierarchy 300". Basically, the app hierarchy 300 may be accessible through the card hierarchy 200. The app hierarchy 300 contains app images 310 of app screens on which the respective apps of the card screens 210 are started.

The display 71 displays these app images 310 one by one. The user is able to access the app hierarchy 300 via the card hierarchy 200. When the user intends to access the app hierarchy 300, the user taps the card screen 210 selected from the card hierarchy 200, in the state where the card screen 210 is displayed on the display 71. Then, the firmware 45 displays the app image 310 corresponding to that card screen 210 on the display 71.

When the user intends to return from the app image 310 to the card screen 210, the user presses the back key that has been provided as the enter key 53 of the control box 50 (see FIG. 2).

Further, the user is able to switch the app images 310 within one app, by operating on the touch panel 55 to swipe to right or left, in the state where any one of the app images 310 is displayed in the app hierarchy 300. For example, it is possible to switch a first function of one app, to a second function of that app having the function different from the first function. The number of such functions (number of app images) may vary depending on the app.

In cases where the app is the camera app, for example, the first function may have a screen of still image shooting mode, and the second function may have a screen of video recording mode. Note that the camera app installed in the firmware 45 by default displays on the display 71 an image taken by the camera.

Incidentally, the direction of movement of the images may be the same with the direction of swiping operation by the finger of the user, or may be opposite to this direction. This may be changed by the user's setting.

4-1c) Coordinate Systems for Image Positioning

Figure 5A:
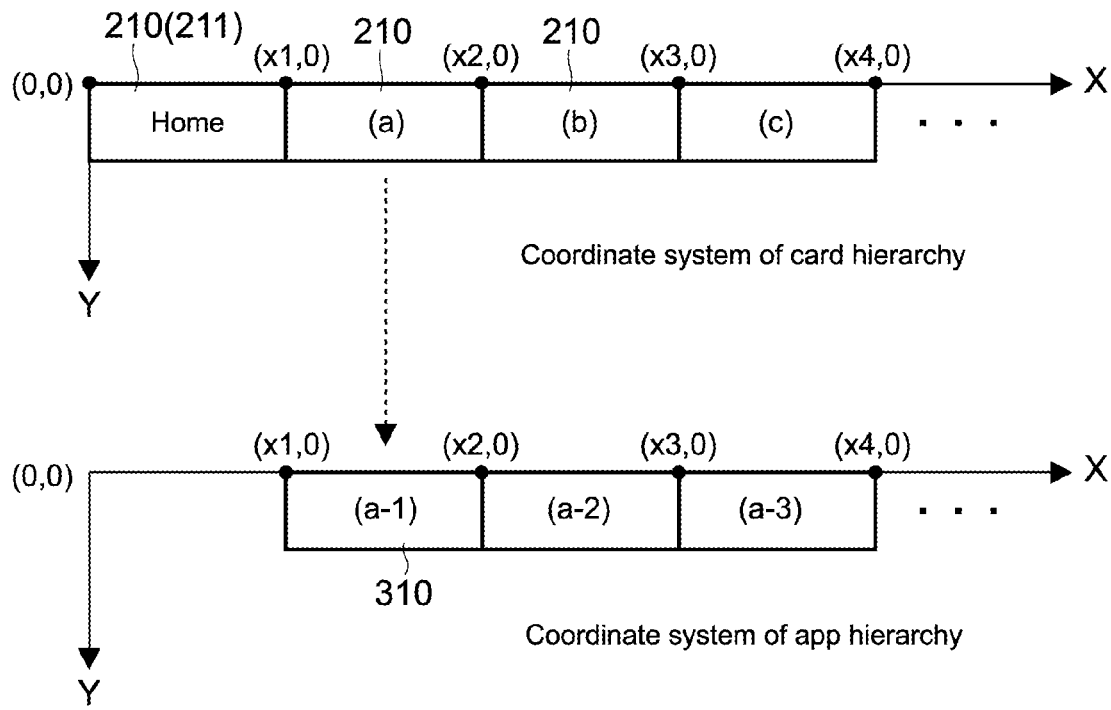
FIGS. 5A and 5B show coordinate systems representing a place to position card images and app images.
Figure 5B:
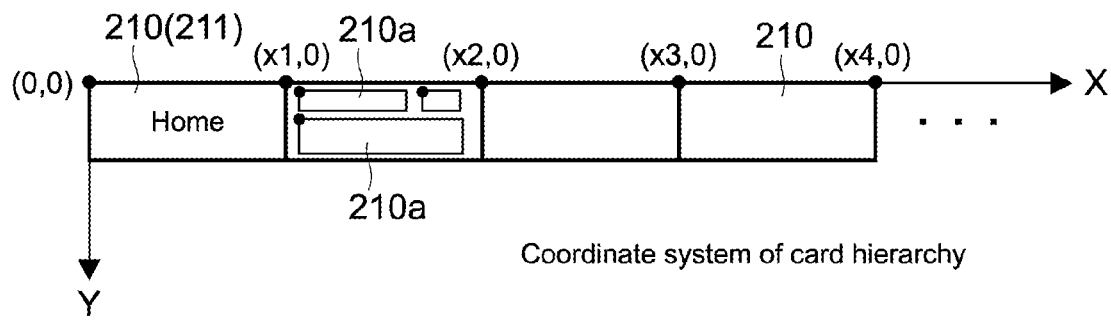

FIGS. 5A and 5B show coordinate systems representing a place to position the card screens 210 and the app images 310. The control box 50 has such coordinate systems stored with respect to each hierarchy, in the memory 52. Further, the control box 50 stores coordinates (position information) of the card screens 210 (card images) and the app images 310 in the memory 52. The card images of the home screen 211 and the setting screen 212, and their position information are stored by default. Further, in cases where there is a plurality of apps in the app hierarchy, the coordinate systems would be stored with respect to each app.

In an example shown in FIG. 5A, the images of the card screens 210 are arranged along the X-axis in the coordinate system of the card hierarchy. The coordinate position of each representative point of the corresponding image, for example, an upper left end point (indicated by a black circle) would each be stored in the memory. The same applies to the coordinate system of the app hierarchy. Accordingly, when the operation event of swiping to right or left is input by the user, the firmware 45 specifies the coordinate of the image in accordance with this operation event, and thus extracts from the memory 52 the image corresponding to this coordinate and displays the image onto the display 71. Note that in the example shown in FIG. 5A, the coordinate (x, y) of the home screen 211 is defined as the point of origin (0, 0), for example.

Furthermore, when the operation event by tapping or the back key is input, the firmware 45 may switch back and forth between the card hierarchy and the app hierarchy, at the point corresponding to the coordinate specified based on the coordinate systems, in accordance with this operation event. The firmware 45 also displays the card screen 210 (card image) or the app image 310 corresponding to the specified coordinate.

On the coordinate system of the app hierarchy of the example shown in FIG. 5A, the app images corresponding to a card image (a) indicating an app (a) are arranged along the X-axis (app image (a-1), app image (a-2), app image (a-3), . . . ). Supposing that the coordinate (x, y) of the card image (a) indicating the app (a) is (x1, 0), the position of the app image (a-1) to be first displayed, by a tapping operation from the state where the card image (a) is displayed, may be specified as (x1, 0), for example. In the case of a card image (b), the position of an app image to be first displayed in the app hierarchy may be specified as (x2, 0), for example.

However, alternatively, the positions of the app images may be those in which (0, 0) would be first displayed for each app, in the app hierarchy.

As will be described later, in cases where one card image is made up of a plurality of objects 210a, as shown in FIG. 5B, the coordinate positions of the respective objects 210a would be stored in the memory 52. FIG. 5B has shown only the coordinate system of the card hierarchy, but this applies to the app hierarchy as well.

4-2) Processing of Switching Screen from Card Hierarchy to App Hierarchy

Figure 6:
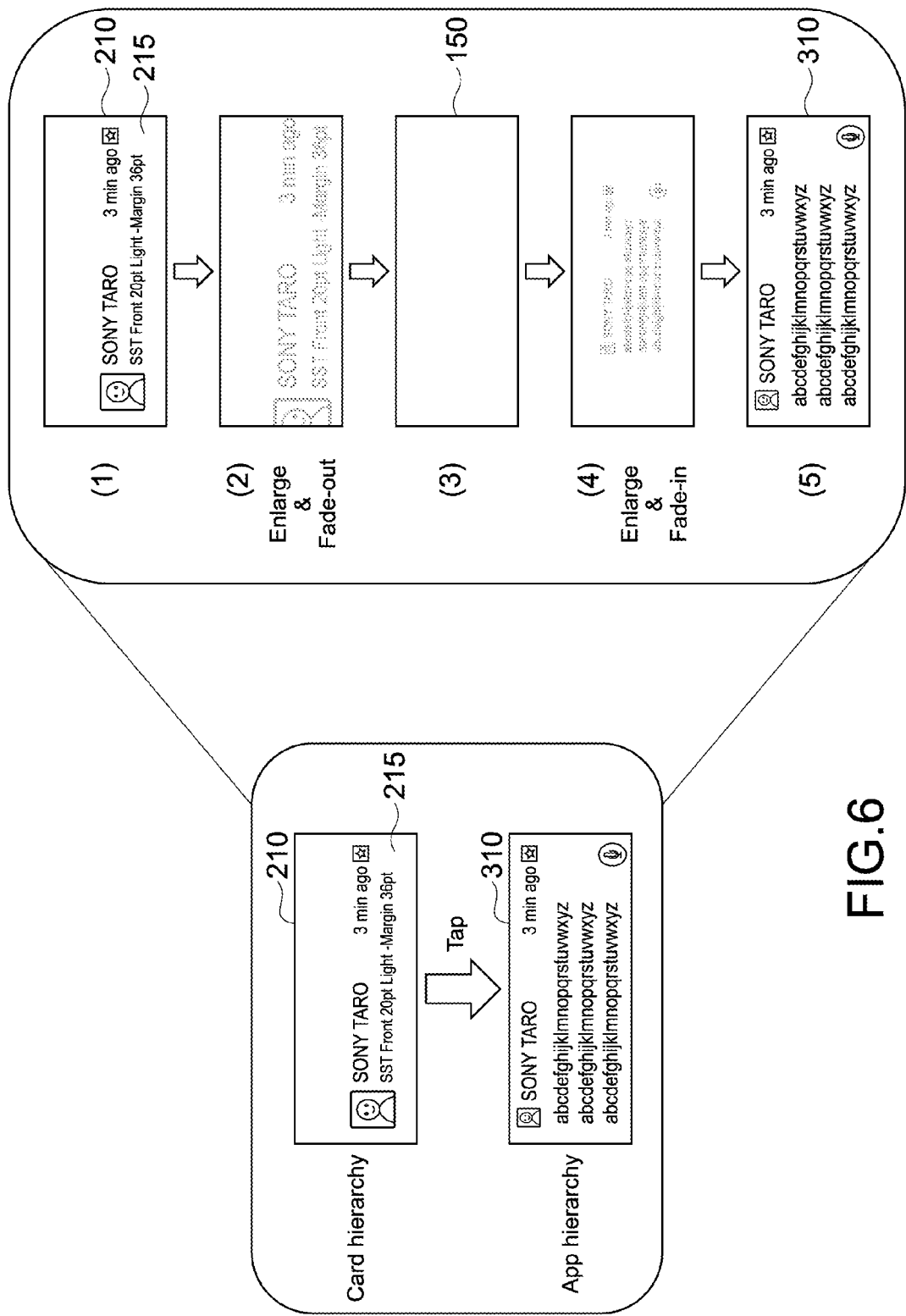
FIG. 6 shows a state of switching the screen from a card hierarchy to an app hierarchy by using animation processing.

FIG. 6 shows a state of switching the screen from the card hierarchy 200 to the app hierarchy 300 by using animation processing.

In the state where any card screen 210 of the card hierarchy 200 is displayed, when the tapping operation is input by the user via the touch panel 55, the firmware 45 may display an animation in an order of (1) to (5) as shown in the right part of FIG. 6.

In (1) to (2), the firmware 45 causes the previously-displayed card image (first image) to fade out. This fade-out processing is displaying a plurality of card images at a given frame rate, the card images having their display luminance (or transparency; the same shall apply hereinafter) gradually decreased in order of time. The frame rate may be, for example, 15 fps. This is merely an example, and the frame rate may be smaller or larger than this. In addition, the firmware 45 also executes processing of gradually enlarging the size of the card image, at the same time with the fade-out processing.

In (3), when the firmware 45 finished with the fade-out processing, it clears the displayed card image. An image (third image) of a screen after the image (first image) was cleared in such a way, which is a patternless screen with the remaining background color as that in the display of the first image, will hereinafter be referred to as a "blank image".

In (4) to (5), the firmware 45 causes the app image (second image) on the app screen 310 corresponding to the app of the above-mentioned card image to fade in. This fade-in processing is displaying a plurality of card images at a given frame rate, the card images having their display luminance gradually increased in order of time. The frame rate may be, for example, 15 fps. This is merely an example, and the frame rate may be smaller or larger than this. In addition, the firmware 45 also executes processing of gradually enlarging the size of the card image (processing of restoring from the small size to the original size), at the same time with the fade-in processing.

Note that, in the above, the card image was expressed as the "first image" and the app image was expressed as the "second image", but this expression is merely for convenience of explanation. That is, the expression of "first" and "second" merely means an order in which the images are to be displayed when two images are switched.

Although the firmware 45 has inserted a blank image 150, this can be omitted. In other words, the fade-in processing may be performed immediately after the fade-out processing. Even in cases where the processing is performed in this way, there are some cases that the user may recognize that the blank image 150 was inserted, depending on the display luminance of the first and second images.

Furthermore, it is also possible that either one of changing the luminance for each frame and changing the size may be executed in these fade-in and fade-out processing.

Figure 7:
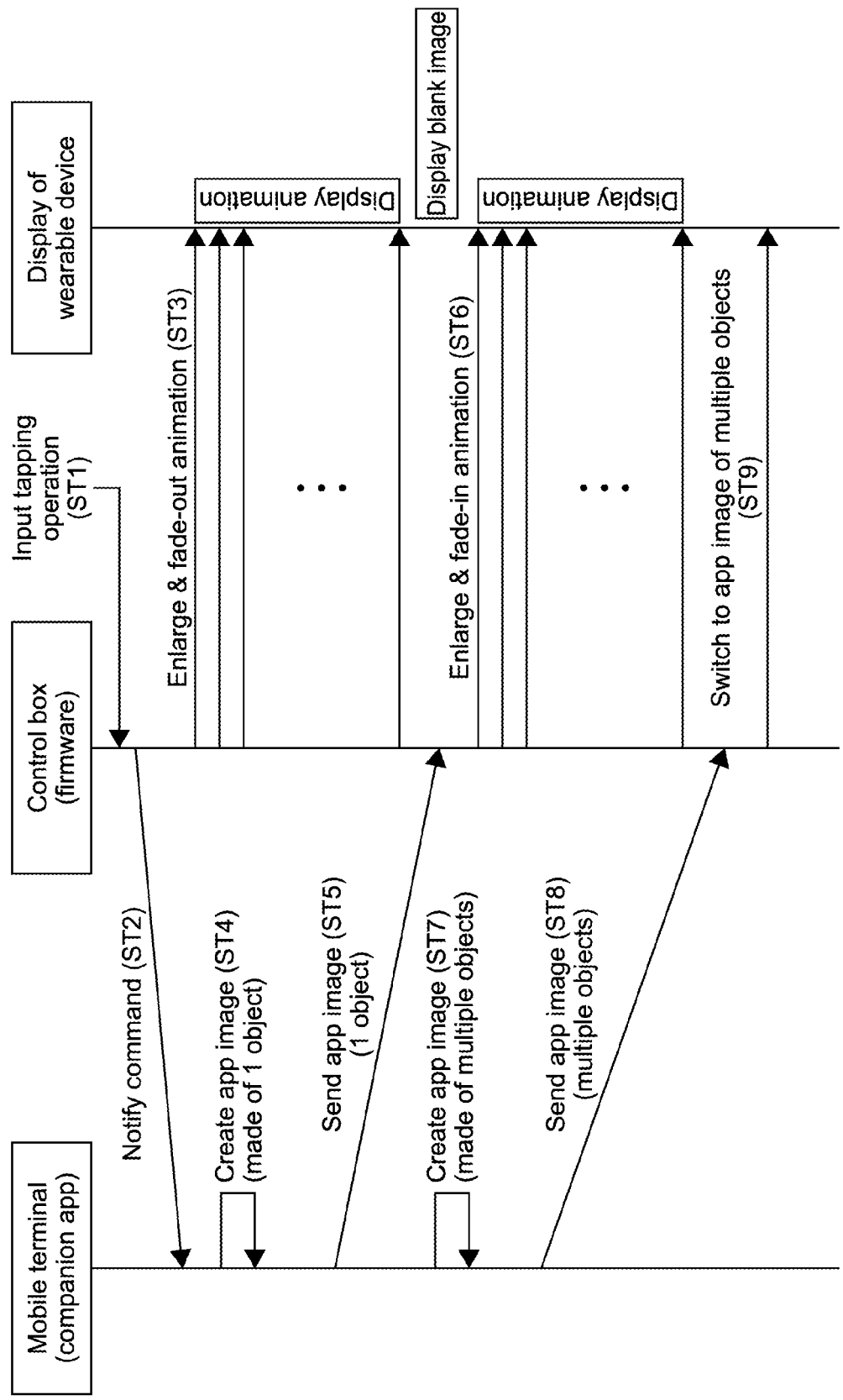
FIG. 7 is a sequence diagram of a system regarding the processing of switching of FIG. 6.

FIG. 7 is a sequence diagram of the system 100 regarding the processing of switching of FIG. 6. Note that, as shown in FIG. 7, oblique arrows shown between the companion app 25 and the firmware 45 indicate that there is a possibility of occurrence of communication delay between them. The same applies to other sequence diagrams.

In the state where the card screen 210 of the card hierarchy 200 is displayed, the user inputs the tapping operation via the touch panel 55 (step 1). Then the firmware 45 of the control box 50 notifies the mobile terminal 30 of this operation event (step 2). In this case, the firmware 45 (or the CPU 51) and the local-area communication unit 34 function as a "notification unit".

The companion app 25 of the mobile terminal 30 receives the notification of the operation event and generates the app image 310 corresponding to the card image of the card screen 210, based on the operation event (step 4). In this case, the companion app 25 and the CPU 31 function as a "generation unit".

This app image is generated by one object. Then, the companion app 25 sends the generated app image 310 made of one object, to the control box 50 (step 5). In this case, mainly, the local-area communication unit 34 functions as a "transmission unit".

On the other hand, the firmware 45, after notifying the operation event, applies the above-described animation processing to the currently displayed card image (step 3).

The animation processing to the card image would be performed during the time when the mobile terminal 30 is generating the app image by step 4 or sending it to the firmware 45.

In the animation processing of step 3, the firmware 45 performs the above-mentioned fade-out processing. In other words, the firmware 45 displays a set of images for animation at the above-mentioned frame rate, the images varying in their sizes and luminance.

At the time when the firmware 45 finished displaying the whole set of images for animation processing in step 3, if the firmware 45 has already received the app image 310 sent by step 5, it applies the animation processing, which is the above-mentioned fade-in processing in this case, to the received app image 310 (step 6).

On the other hand, if the firmware 45 has not received the app image 310 sent by step 5 by the time when it finished displaying the whole set of images for animation processing, the firmware 45 waits for its reception. After the reception, in the same way as the above, the fade-in processing would be applied to the received app image 310 (step 6).

When performing the animation processing, the firmware 45 (or the CPU 51) functions as a "display controller".

Meanwhile, the companion app 25, after step 5, generates the app image, which is the same image as the app image 310 that has been sent to the control box 50, the image including a plurality of objects (step 7). Then the companion app 25 sends this app image to the control box 50 (step 8). The firmware 45 would be executing the fade-in processing of the app image (step 6), during the time when the companion app 25 is generating the app image including the plurality of objects (or sending it to the firmware 45) by step 7.

Then, at the time when the firmware 45 finished displaying the whole set of images for animation processing in step 6, if the firmware 45 has already received the app image including the plurality of objects sent by step 8, it executes the following processing. That is, the firmware 45 replaces the currently displayed app image 310 made of one object with the received app image including the plurality of objects (step 9).

On the other hand, if the firmware 45 has not received the app image including the plurality of objects sent by step 8 by the time when it finished displaying the whole set of images for animation processing, the firmware 45 waits for its reception. After the reception, in the same way as the above, the firmware 45 would replace the currently displayed app image 310 made of one object with the received app image including the plurality of objects (step 9).

Figure 8:
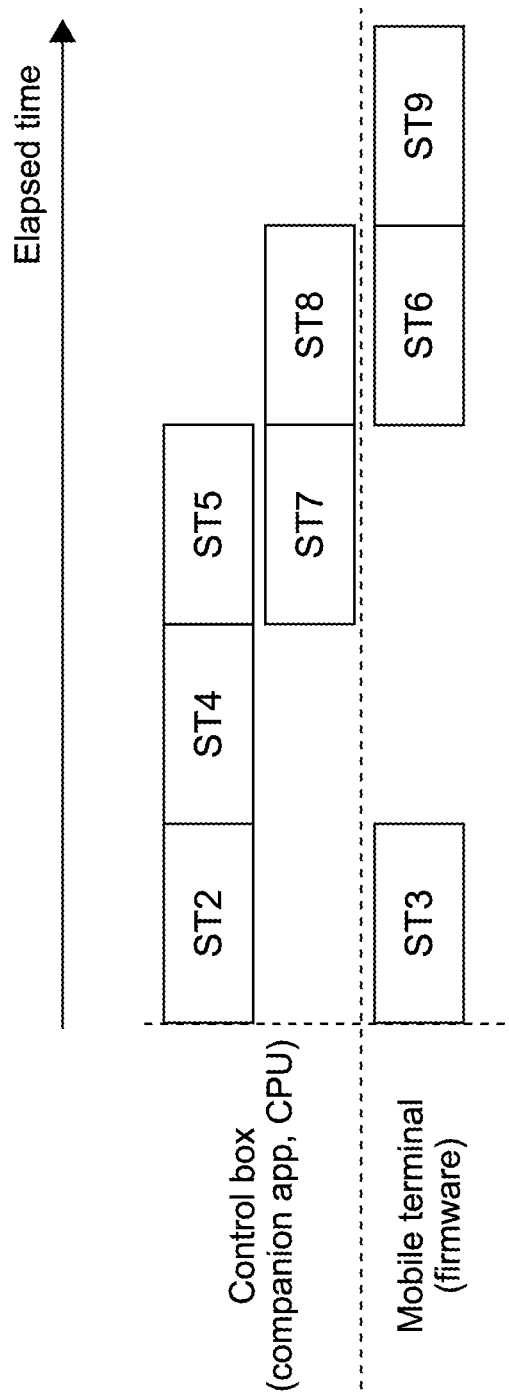
FIG. 8 shows pipeline processing (parallel processing) in the sequence shown in FIG. 7.

FIG. 8 shows pipeline processing (parallel processing) in the sequence shown in FIG. 7. As shown in FIG. 8, pipeline processing may be executed for the processing of steps 2, 4 and 5 and the processing of step 3. Pipeline processing may also be executed for the processing of steps 7 and 8 and the processing of step 6. Furthermore, the CPU of the mobile terminal 30 may execute the processing of step 5 and step 7 by pipeline processing as well.

Note that FIG. 8 illustrates the pipeline processing schematically so that the description can be understood more easily. For example, the timing of the end, or the like, of step 2 and that of step 3 do not need to be the same with each other. The timing of the start, or the like, of step 5 and that of step 7 do not need to be the same with each other either.

As described above, the control box 50 is configured to apply the animation processing to the currently displayed first image, in parallel with the processing by the mobile terminal 30 to generate the image based on the operation event in accordance with the tapping operation, or in parallel with the processing by the mobile terminal 30 to send this image, after the notification of this operation event. Thus, even in cases where communication delay may arise, the control box 50 is able to suppress occurrence of drop frame and a jerky state, during the switching of the screen from the card hierarchy 200 to the app hierarchy 300 after the tapping operation. This makes it possible to display easily viewable images with less stress to the user.

For example, even in cases where the communication system used as the local-area communication unit 34 in the system 100 is one such as Bluetooth, which has lower communication speed than WiFi, this embodiment makes it possible to sufficiently reduce the influence of the communication delay. This makes it possible to reduce power consumption of the control box 50, as compared to a case where WiFi is used.

Specifically, by executing the fade-in processing after the fade-out processing, it is able to provide seamless switching of the images to the user.

In this embodiment, in the switching of the images from the card hierarchy (upper hierarchy) to the app hierarchy (lower hierarchy), a same-size image of the card hierarchy would be enlarged and disappeared, and an image of the app hierarchy would be enlarged to become a same-size image. In the switching of the images from the app hierarchy (lower hierarchy) to the card hierarchy (upper hierarchy), a same-size image of the card hierarchy would be reduced and disappeared, and an image of the app hierarchy would be reduced to become a same-size image.

In such a manner, the move from up to down is expressed by animation processing of "enlarging" and the move from down to up is expressed by animation processing of "reducing". Thus, as a directionality of the move between the images is expressed, this appears to be more intuitive to the user.

In this embodiment, with an insertion of the blank image 150 between the fade-out processing and the fade-in processing, this may also allow reducing the influence of the communication delay. For example, the firmware 45 may variably control the displaying time of the display of the blank image 150, depending on the communication delay time.

For example, if there is an occurrence of communication delay in step 5, the blank image 150 may be displayed until the firmware 45 receives the app image 310. Therefore, some users may feel that the time after the fade-out processing of the card image is a little long; but they would feel less stress than in the case where a problem such as drop frame occurs.

In this embodiment, the mobile terminal 30 sends the plurality of objects to the control box 50 while showing the user the animation. Thus, the control box 50 is able to obtain the plurality of objects which is relatively large in capacity, without showing a state of display that gives the user stress.

Further, in step 9, the firmware 45 replaces the currently displayed app image 310 made of one object with the received app image including the plurality of objects. Thus, the firmware 45 is able to execute processing for each of the objects, so it makes it possible to deal with various kinds of apps. For example, by separating a logo mark image and an image showing a text, the firmware 45 is able to execute processing to scrollably display the image of the text, while keeping the logo mark displayed on a fixed region of the app screen, for example.

In this embodiment, even if communication delay arises in step 8, the result may be only some delay in the subsequent reception of the operation, so it is possible to suppress occurrence of drop frame and a jerky state during the switching of the screen.

4-3) Processing of Switching Screen from App Hierarchy to Card Hierarchy

Figure 9:
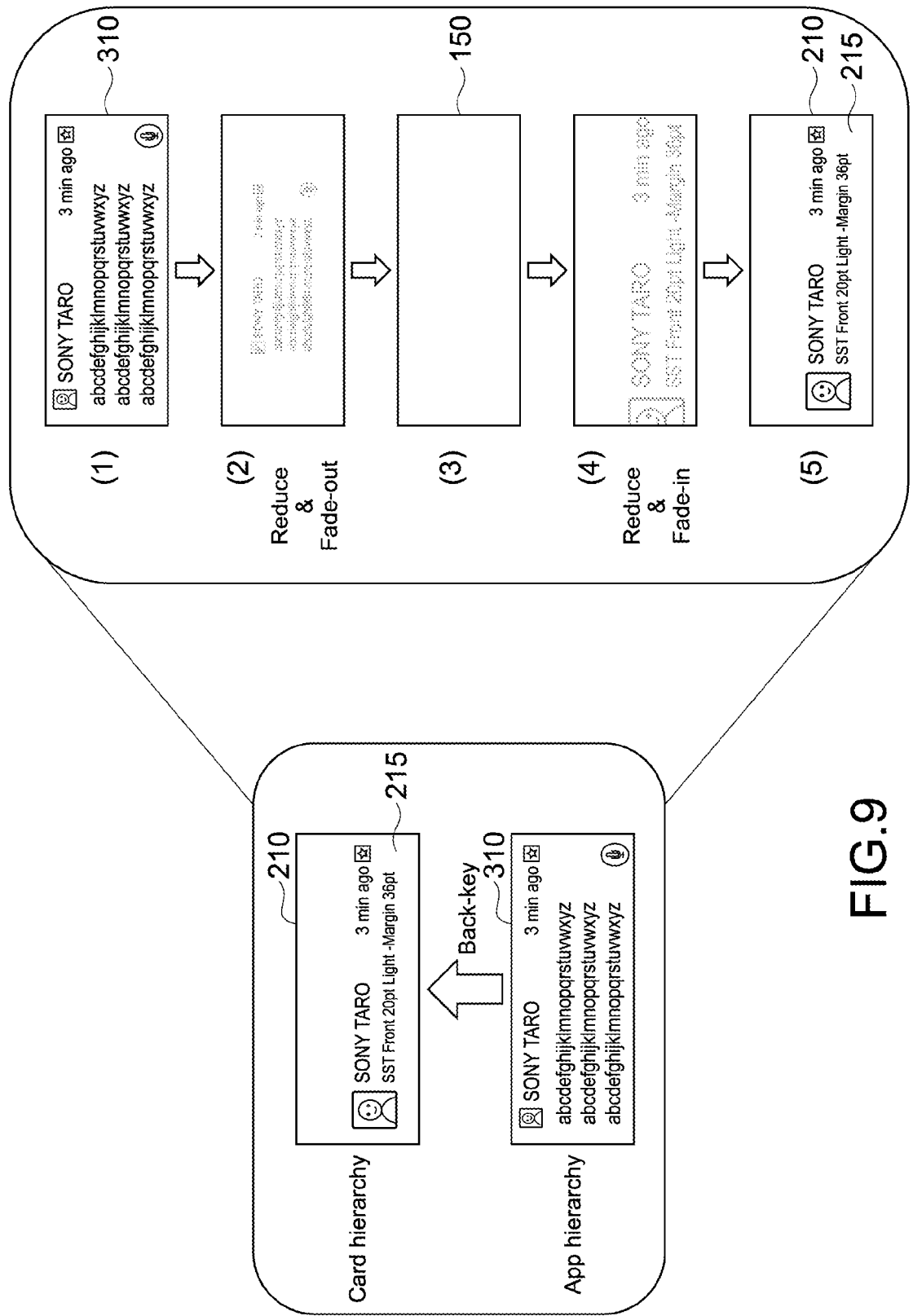
FIG. 9 shows a state of switching the screen, counter to the above case, from the app hierarchy to the card hierarchy by using the animation processing.

FIG. 9 shows a state of switching the screen, counter to the above case, from the app hierarchy 300 to the card hierarchy 200 by using the animation processing.

Figure 10:
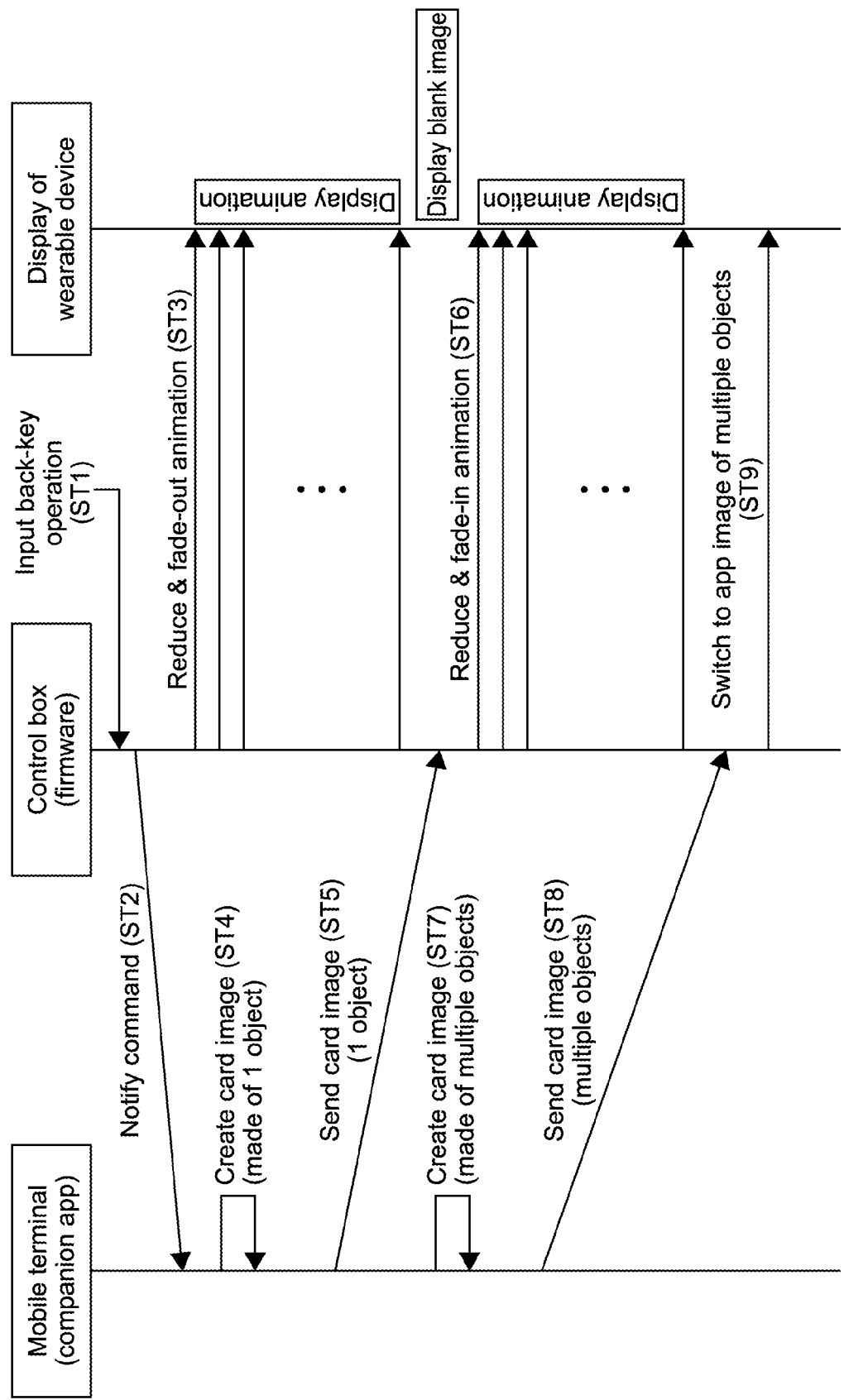
FIG. 10 is a sequence diagram of a system regarding the processing of switching of FIG. 9.

In the state where any app screen 310 of the app hierarchy 300 is displayed, when the back key is pressed by the user, the firmware 45 may display an animation in an order of (1) to (5) as shown in the right part of FIG. 9. FIG. 10 is a sequence diagram of the system 100 regarding the processing of switching of FIG. 9.

The processing shown in FIGS. 9 and 10 is different from the processing of FIGS. 6 and 7 in the following points. That is, when the fade-out processing is applied to the first image which is the app image, the size of the image is reduced. When the fade-in processing is applied to the second image which is the card image of the card hierarchy 200, the size of the image (enlarged size) is reduced (returned to the original size).

The points that the luminance of the first image is gradually decreased in the fade-out processing and that the luminance of the second image is gradually increased in the fade-in processing are the same as in the processing of FIGS. 6 and 7.

2. Second Embodiment

Next, control of display according to a second embodiment will be described. In the following descriptions, the same devices, functions and the like as what was described above in the first embodiment will be simplified or omitted, and different points will be mainly described.

In the above-described first embodiment, an animation effect has been applied when switching the screen from the card hierarchy 200 to the app hierarchy 300, but this has not been applied when switching the screen within the same hierarchy, that is, the switching of the screen within the same hierarchy by swiping to right or left. In this second embodiment, the animation effect will also be applied to the switching within the same hierarchy by the swiping to right or left.

1) Processing of Switching Screen by Swiping to Right

Figure 11:
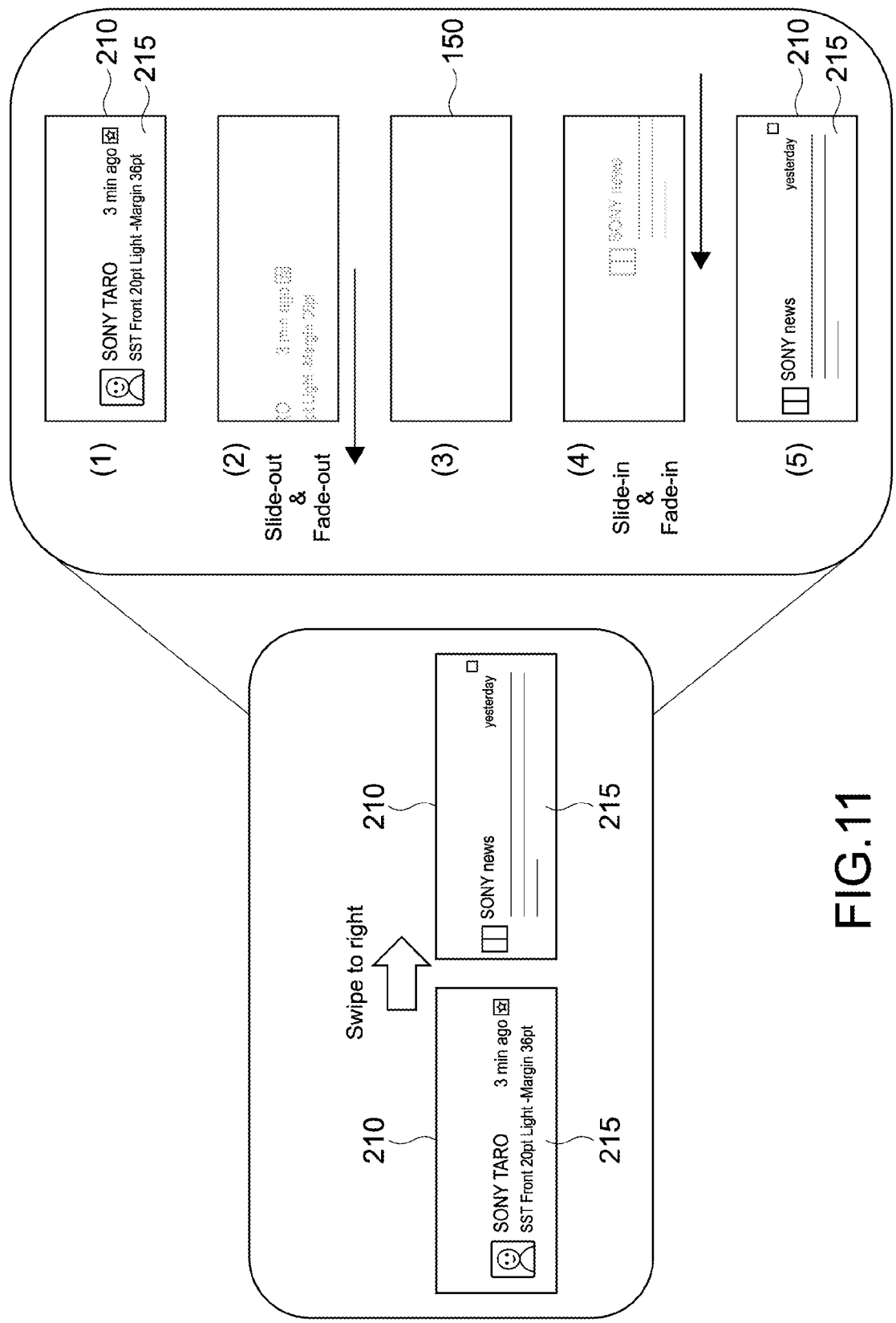
FIG. 11 shows a state of switching the screen within the card hierarchy by swiping to right, using the animation processing.

FIG. 11 shows a state of switching the screen within the card hierarchy 200 by swiping to right, for example, using the animation processing. The switching within the card hierarchy 200 may include switching of display of an app, and switching to the home screen 211. For example, the left part of FIG. 11 shows a state of switching one card image (first image) to another (second image) by an input of the user's operation of swiping to right. Specifically, the screen is switched as shown in (1) to (5) in the right part of FIG. 11.

In (1) to (2), the firmware 45 causes the previously-displayed first image to fade out. Similarly to the above-described first embodiment, this fade-out processing is displaying a plurality of card images at a given frame rate, the card images having their display luminance gradually decreased in order of time. In addition, together with this fade-out processing, the firmware 45 also executes display processing of sliding a first screen (slide-out) in such a manner that the first screen goes out of frame to the left (or may be, to the right).

In (3), the firmware 45 displays the blank image 150, similarly to the above-described first embodiment.

In (4) to (5), the firmware 45 causes the second image to fade in. Similarly to the above-described first embodiment, this fade-in processing is displaying a plurality of card images at a given frame rate, the card images having their display luminance gradually increased in order of time. In addition, together with this fade-in processing, the firmware 45 also executes display processing of sliding a second screen (slide-in) in such a manner that the second screen comes in frame from the right (or may be, from the left).

Note that it is also possible that either one of the processing of changing the luminance for each frame and the processing of sliding may be executed in these fade-in and fade-out processing.

Figure 12:
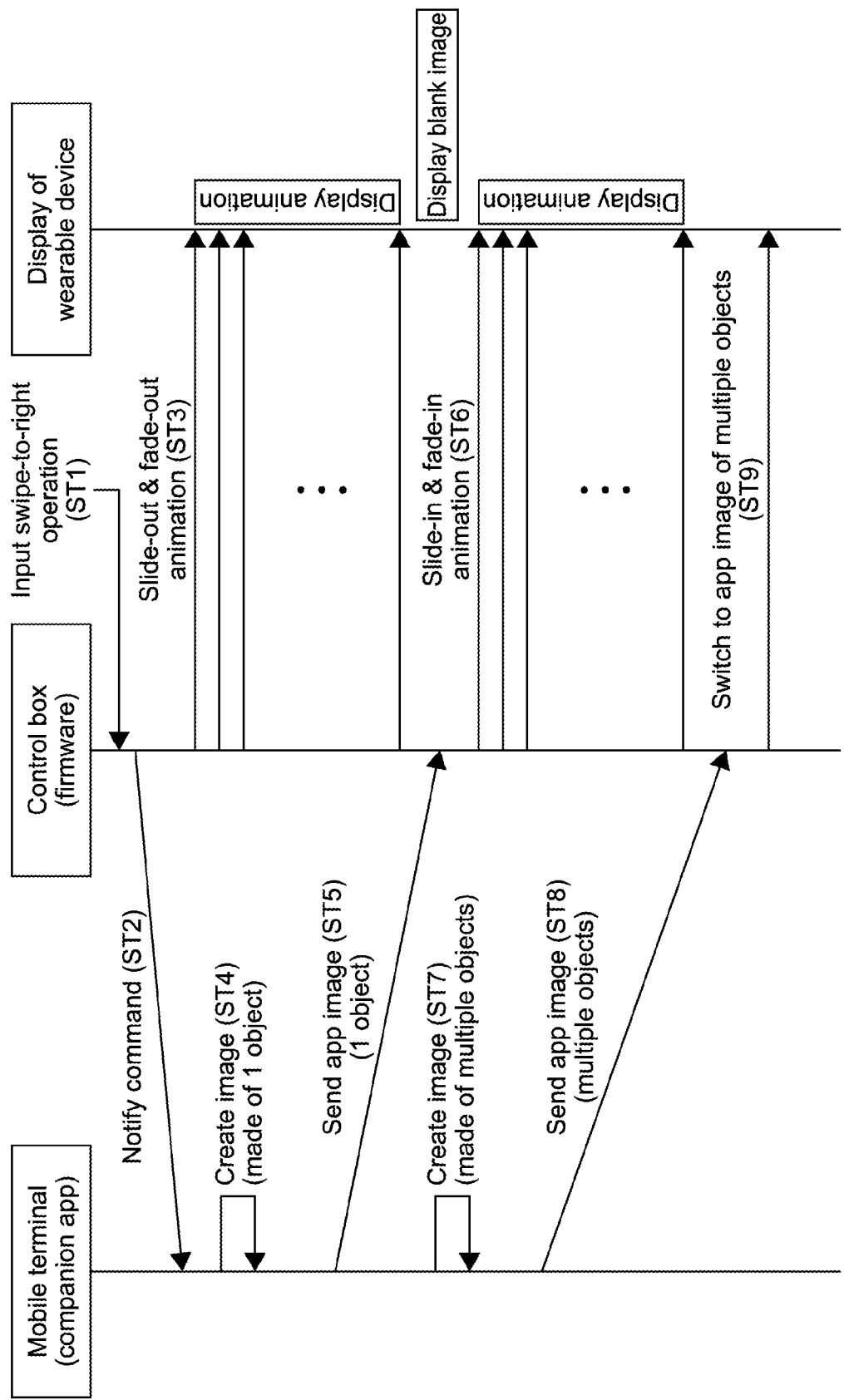
FIG. 12 is a sequence diagram of a system regarding the processing of switching of FIG. 11.

FIG. 12 is a sequence diagram of the system 100 regarding the processing of switching of FIG. 11.

This sequence is different from the sequence for switching the screen from the card hierarchy 200 to the app hierarchy 300 (FIG. 7) in the point that slide-out processing is executed instead of the processing of enlarging the size of the image.

2) Processing of Switching Screen by Swiping to Left

Figure 13:
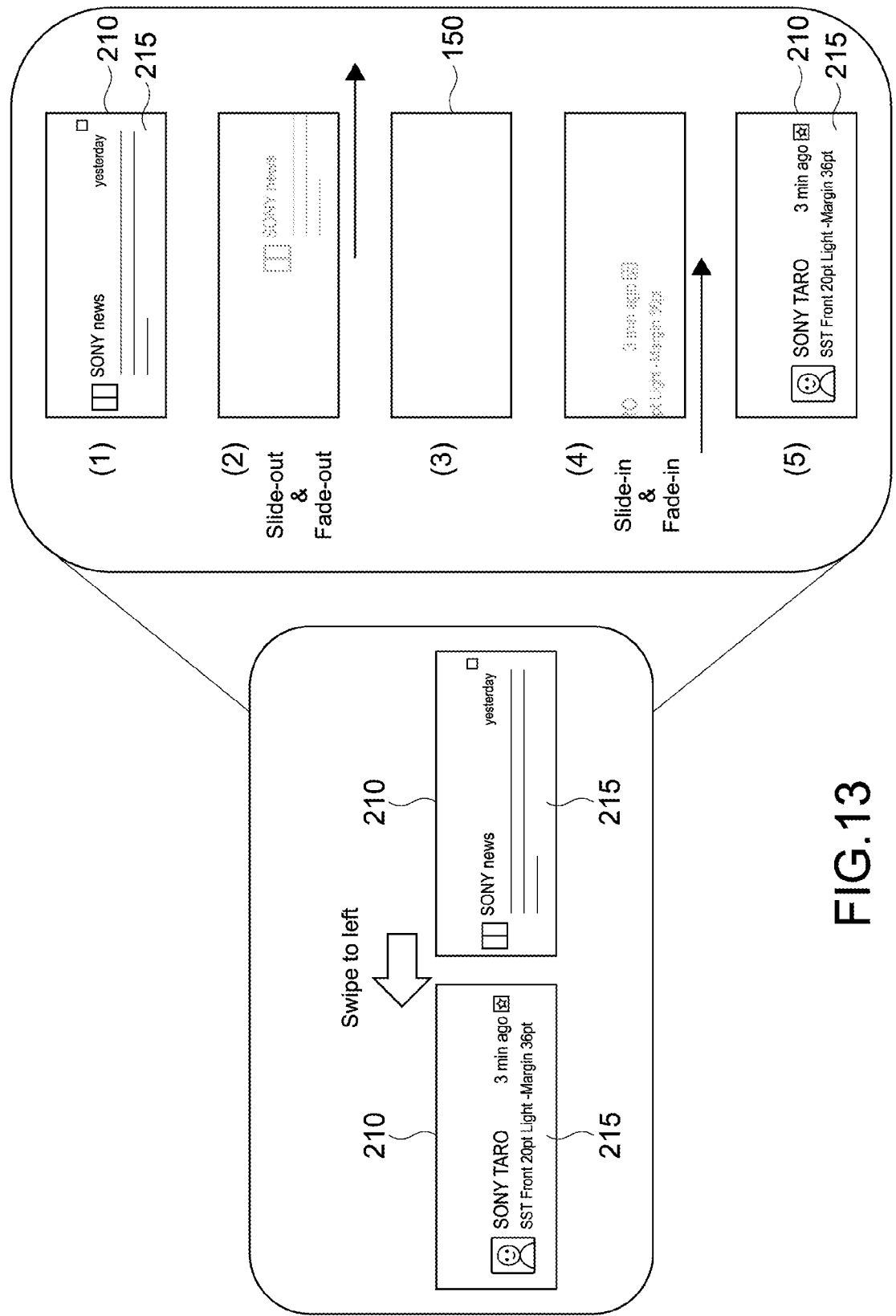
FIG. 13 shows a state of switching the screen within the card hierarchy by swiping to left, using the animation processing.
Figure 14:
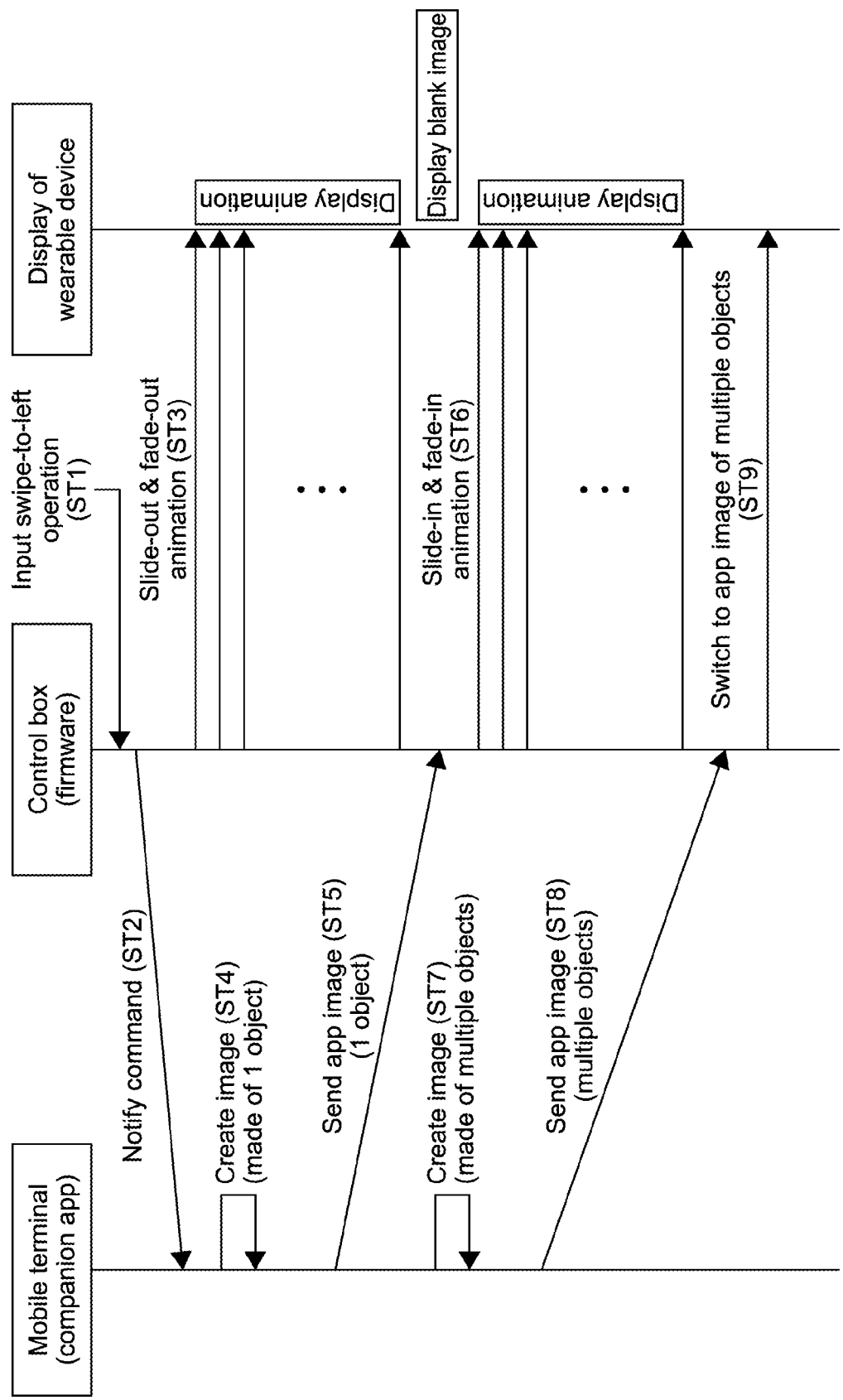
FIG. 14 is a sequence diagram of a system regarding the processing of switching of FIG. 11.

FIG. 13 shows a state of switching the screen within the same card hierarchy 200 by swiping to left; and FIG. 14 shows the sequence of the system 100 in this case. This processing of switching is the same as the above-described processing by swiping to right, except that the movement of the image is opposite in direction.

As described above, also in the processing of switching of the screen by the input of the swiping operation to right or left by the user, it makes it possible to cover the communication delay, and display easily viewable images with less stress to the user, as in the above-described first embodiment.

Note that although the processing of switching the screen within the card hierarchy 200 by the swiping to right or left has been described above in the second embodiment, the animation processing may also be applied to processing of switching the screen within the app hierarchy 300 by swiping to right or left.

3. Third Embodiment

1) Processing of Switching Card Images within Card Hierarchy

With reference to FIG. 4, typically, the companion app 25 of the mobile terminal 30 stores all the registered card images in the memory 32. Meanwhile, the firmware 45 stores the predetermined number of card images (for example, the card images in the order of registration, up to the predetermined number) out of the registered card images, in the memory 52 in the control box 50.

Then, as described above, the firmware 45 displays on the display 71 the card image specified by the user via the touch panel 55 in the manner as described above, extracting the image from the memory 52 based on the coordinate system. Further, the firmware 45 requests for transmission of the card image from the memory 32 of the mobile terminal 30 via the companion app 25, as necessary; receives the transmitted image; and displays it on the display 71. Specifically, the firmware 45 and the companion app 25 may operate in the following manner.

Figure 15:
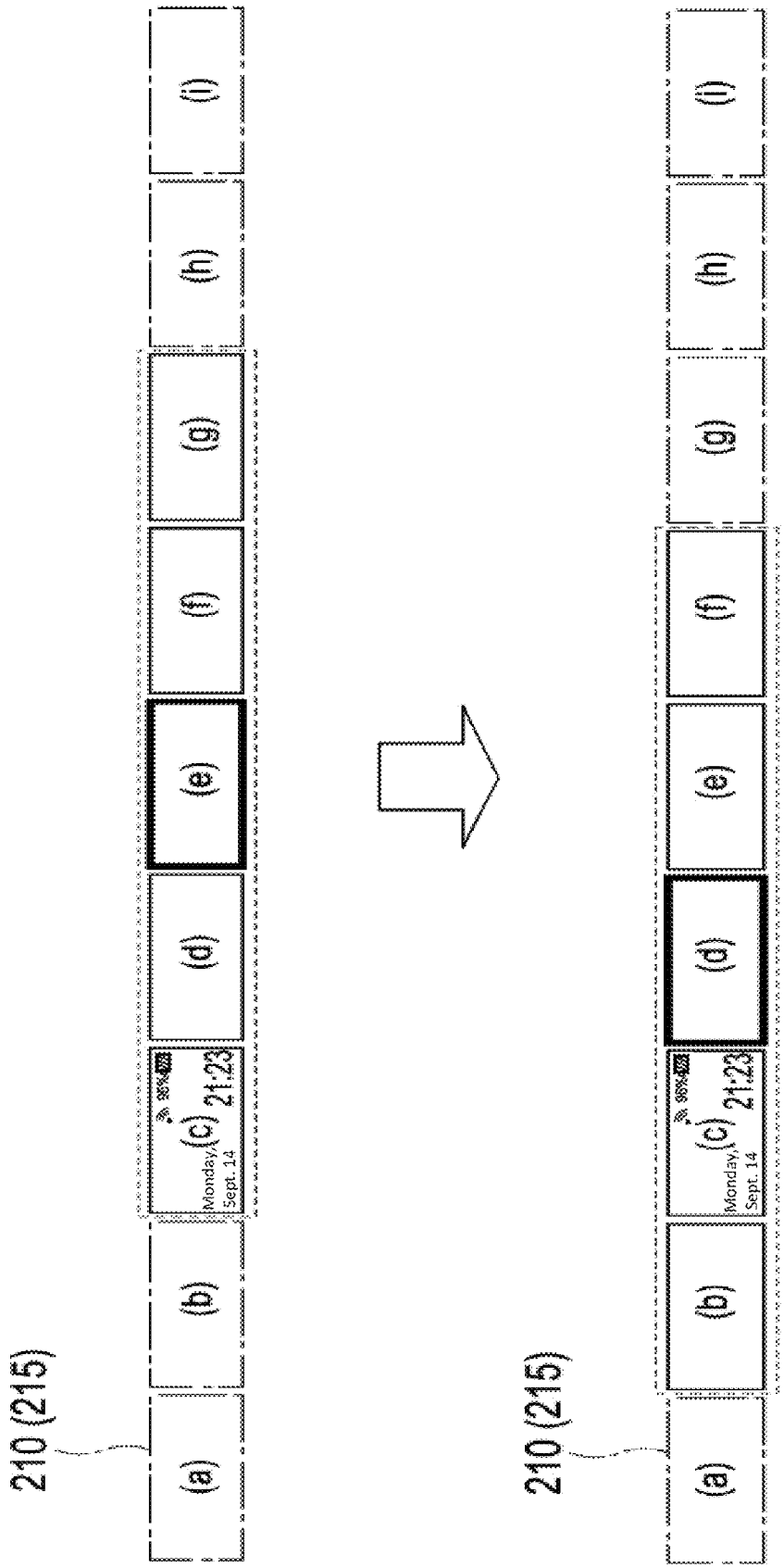
FIG. 15 illustrates an operation of switching card screens within the card hierarchy.

FIG. 15 illustrates an operation of switching the card screens 210 within the card hierarchy 200. For example, suppose that the memory 32 of the mobile terminal 30 stores nine card images (a) to (i), as shown in the upper part of FIG. 15. Then, suppose that the memory 52 of the control box 50 stores, for example, five card images (c) to (g) (a part framed by the dotted line) out of these nine card images. The five card images (c) to (g) are consecutive card images. At this moment, a card image (e) indicated by the thick line frame is displayed on the display 71. Note that a card image (c) is the card image of the home screen.

Suppose that, from the state as shown in the upper part of FIG. 15, a swiping operation to move the card screen 210 to the left has been input by the user. Then, as shown in the bottom part of FIG. 15, the firmware 45 switches the currently displayed card image (e) to a card image (d), and discards a card image (g) that has been previously stored at an end (right-end) of the card images.

Further, when there is an input of the above-mentioned swiping operation, the firmware 45 notifies the mobile terminal 30 of the input operation event. The companion app 25 extracts a newly placed card image (b) at an end (left-end) of the card images, from the memory 32, and sends it to the control box 50. The firmware 45 receives it and stores it into the memory 52.

Thus, the firmware 45 maintains the state in which the predetermined number (for example, five) of card images is stored in the memory 52.

Such processing makes it possible to smoothly switch the card screens 210 while reducing the costs by reducing the necessary memory capacity in the control box 50, or by using small-capacity memory.

Note that the control box 50 keeps the card image of the home screen 211 and the card images of the screens of default apps such as the camera app, and does not discard these images. In this case, the control box 50 may be configured to store the card images other than those of the home screen 211 and the default apps, within the predetermined number of card images, in the memory 52.

2) Sequence of Processing of Switching Images

Next, a specific sequence regarding the above-described processing of switching the images will be described.

Figure 16:
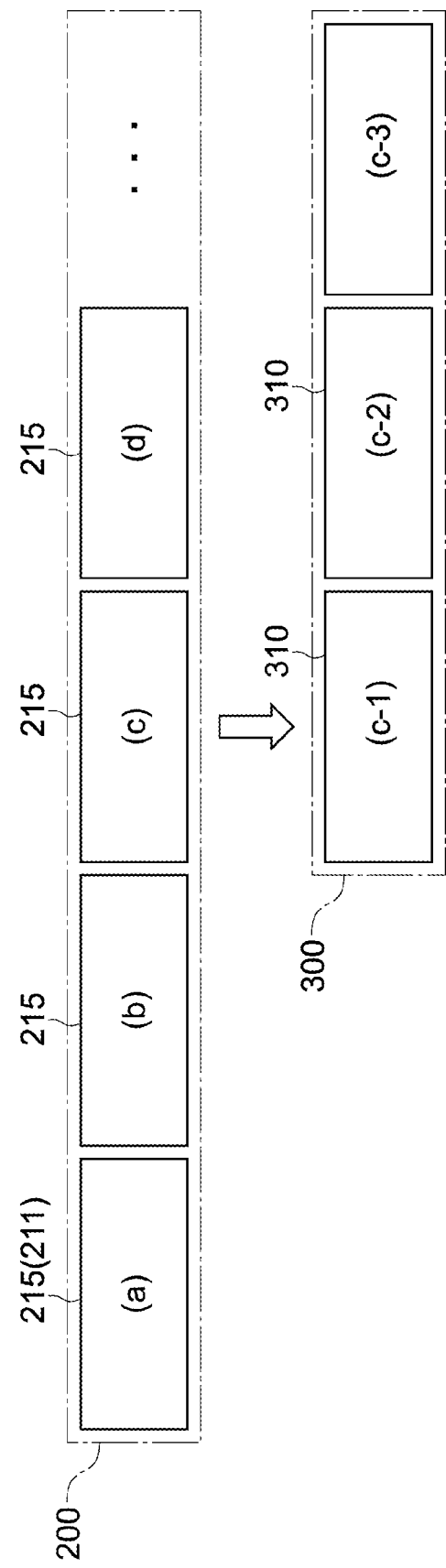
FIG. 16 shows an example of positioning of card images within the card hierarchy, and of app images of an arbitrary app within the app hierarchy.

FIG. 16 shows an example of positioning of card images within the card hierarchy, and of app images of an arbitrary app within the app hierarchy. The case shown here is an example in which five card images are contained in the card hierarchy 200, and three app images 310 corresponding to an app (c) represented by the card image (c) are contained in the app hierarchy 300.

Hereinafter, the section of "2-1) Processing of switching images by swiping operation" illustrates an example in which the display 71 displays card images (a) to (c) in order. The section of "2-2) Processing of switching images by tapping operation and back-key operation" illustrates an example which begins from a state where the card image (c) of the app (c) is displayed on the display 71, and the display 71 displays app images 310 (c-1) to (c-3) in order. Further, in the following, for simplifying the explanation, the example will be illustrated regarding the case where the number of images that the control box 50 keeps is two, and direction of swiping is a fixed direction (for example, to the right).

2-1) Processing of Switching Images by Swiping Operation

Figure 17:
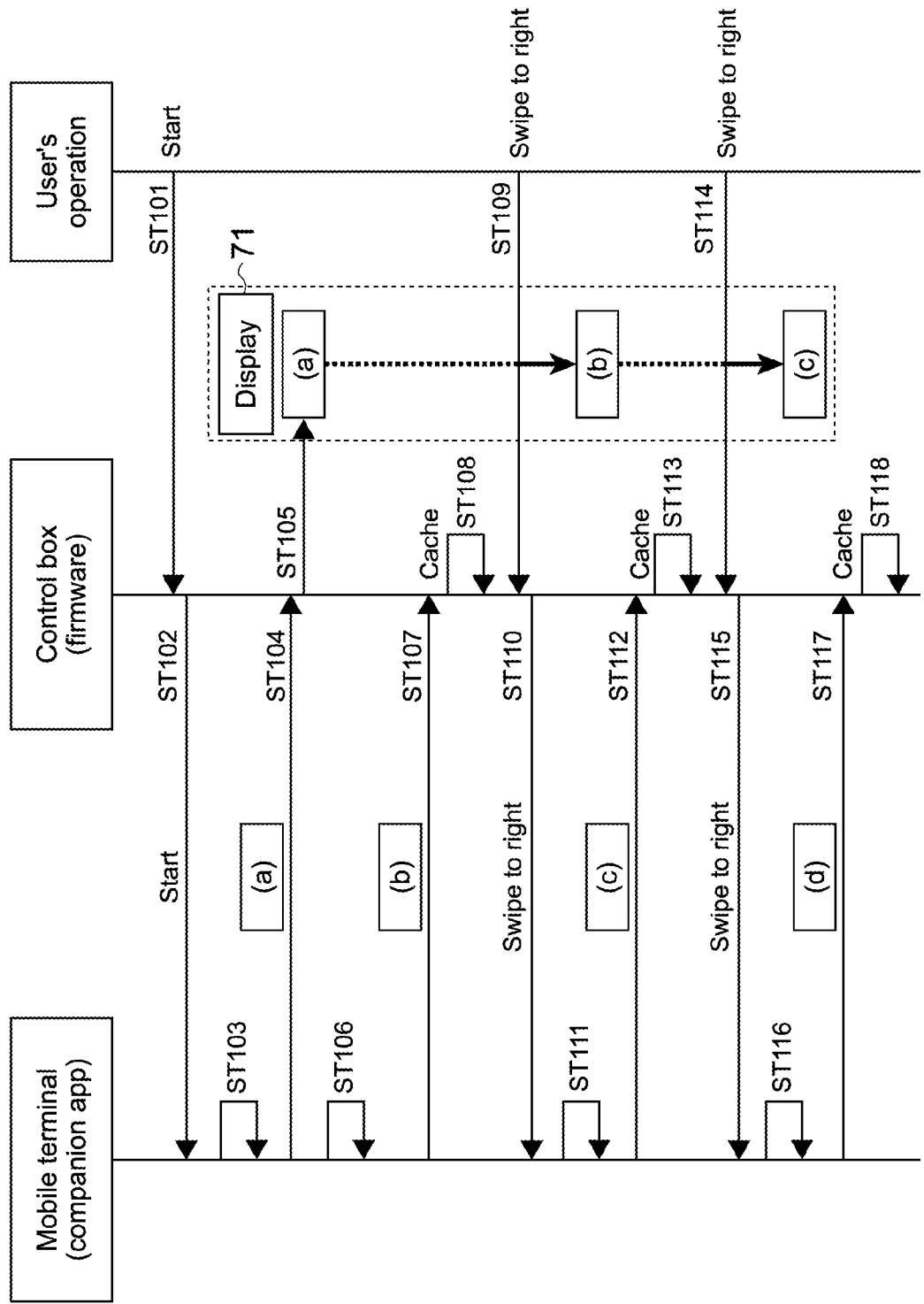
FIG. 17 shows a sequence of processing of switching images within the card hierarchy by a swiping operation.

FIG. 17 shows a sequence of the processing of switching the images within the card hierarchy by the swiping operation.

When a "start" operation (for example, turning the power button ON) is input as the operation event by the user (step 101), the firmware 45 notifies the companion app 25 of this operation event (step 102). On the basis of this, the companion app 25 generates a card image (a) (for example, the home screen) (step 103), and sends it to the firmware 45 (step 104). The firmware 45 (display controller) receives this card image (a) (first image) and allows the display 71 to display it (step 105).

The companion app 25, after sending the card image (a) by step 104 (or while sending it), generates a card image (b) (second image) at a position adjacent to the position of the card image (a) on the coordinate system shown in FIGS. 5A and 5B (step 106) and sends it to the firmware 45 (step 107). The firmware 45 stores it in the memory (cache) (step 108).

In this case, the memory functions as a "storage unit". As this memory, it is desirable to use relatively high-speed operating memory.

After that, if a "swipe to right" operation is input as the operation event by the user (step 109), the firmware 45 extracts the card image (b) stored in the memory and displays it. Further, the operation event is notified to the companion app 25 (step 110); and the companion app 25 generates a card image (c) (second image) adjacent to the card image (b) (first image), based on the reception of this notification (step 111). The companion app 25 sends the generated card image (c) to the firmware 45 (step 112). The firmware 45 stores it in the memory (step 113).

Steps 114 to 118 are executed in the same manner as the processing of steps 109 to 113.

Note that display processing of the card image (b) based on the operation event of step 109 and display processing of the card image (c) based on the operation event of step 114 may each be performed by the animation processing as described above in the second embodiment.

As described above, when the companion app 25 sends a card image that has been requested by the user's operation event, the companion app 25 then sends a card image adjacent to the sent card image, even in the absence of any subsequent operation event. As a matter of course, in cases where the five images shown in FIG. 15 are retained by the control box 50, a card image (for example, the card image (b) shown in FIG. 15) positioned on the coordinate system at a predetermined distance from the position of the displayed card image (for example, the card image (e) shown in FIG. 15) may be generated and sent to the firmware 45.

Such processing allows the firmware 45 to smoothly switch the screens in accordance with the operation event, with little influence of communication delay. Further, for example, by discarding the card images which are no longer used, the firmware 45 may reduce the costs by reducing the necessary memory capacity, or by using small-capacity memory.

2-2) Processing of Switching Images by Tapping Operation and Back-Key Operation

Figure 18:
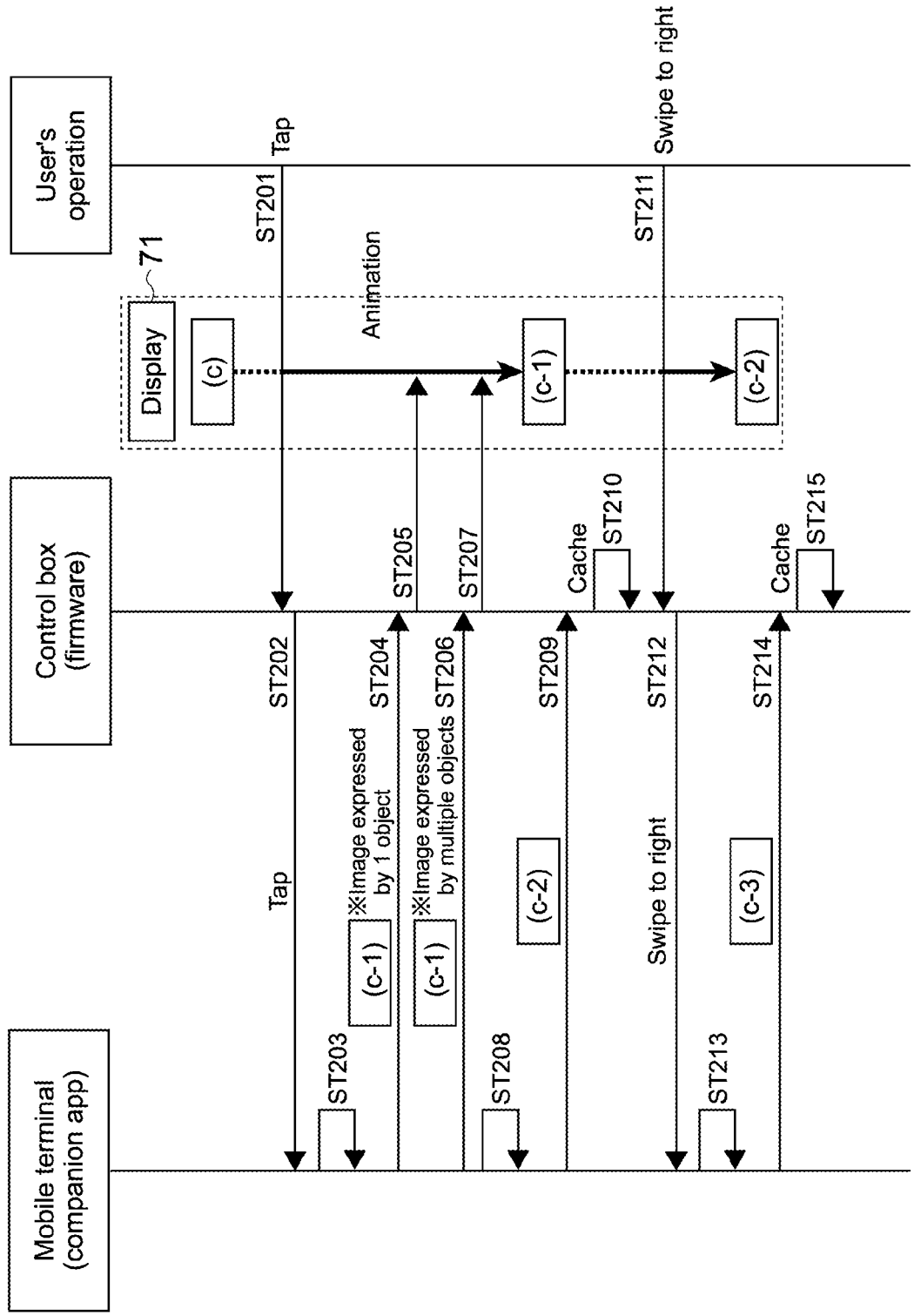
FIG. 18 shows a sequence of processing of switching images by an operation event including a tapping operation.

FIG. 18 shows a sequence of the processing of switching the images by the operation event including the tapping operation.

After step 118 of FIG. 17, if a "tap" operation is input as the operation event by the user (step 201), the firmware 45 notifies the companion app 25 of this operation event (step 202). On the basis of this, the companion app 25 generates an app image 310 (c-1) (step 203). The companion app 25 sends it to the firmware 45 (step 204). The firmware 45 (display controller) receives this app image 310 (c-1) (first image) and allows the display 71 to display it.

The processing of switching from the card image (c) to the app image 310 (c-1) may be, for example, the animation processing as in steps 5, 6, 8 and 9 shown in FIG. 7. Further, the companion app 25 sends the image expressed by one object and the image expressed by a plurality of objects to the firmware 45, in the respective steps 204 and 206, similarly to that shown in FIG. 7.

The companion app 25, after step 206 or while performing step 206, generates an app image 310 (c-2) (second image) adjacent to the position of the app image 310 (c-1) (step 208) and sends it to the firmware 45 (step 209). The firmware 45 receives this app image 310 (c-2) and stores it in the memory (step 210).

After that, for example, if a "swipe to right" operation is input as the operation event by the user (step 211), the firmware 45 extracts the app image 310 (c-2) stored in the memory and displays it. Further, when the operation event is notified (step 212); and the companion app 25 generates an app image 310 (c-3) (second image) adjacent to the previously sent app image 310 (c-2) (first image) (step 213) and sends it to the firmware 45 (step 214). The firmware 45 stores it in the memory (step 215).

As described above, when the companion app 25 sends an app image that has been requested by the user's operation event, the companion app 25 then sends an app image adjacent to the sent app image, even in the absence of any subsequent operation event. As a matter of course, in cases where the five images shown in FIG. 15 are retained by the control box 50, an app image positioned on the coordinate system at a predetermined distance from the position of the displayed app image may be generated and sent to the firmware 45.

Although an operation of swiping to right has been mentioned as an example of the operation event, the same processing will also be applied to an operation of swiping to left.

4. Fourth Embodiment

Next, a system according to a fourth embodiment of the present disclosure will be described. This embodiment assumes a case where a developer of apps is to create an app with the use of API (Application Programming Interface), the app being configured to perform switching of the screen by a swiping operation and by a tapping operation. This app may be one executed by a mobile terminal. An example of a developed app to enable the sequence illustrated above in the third embodiment will be described, for example.

Figure 19:
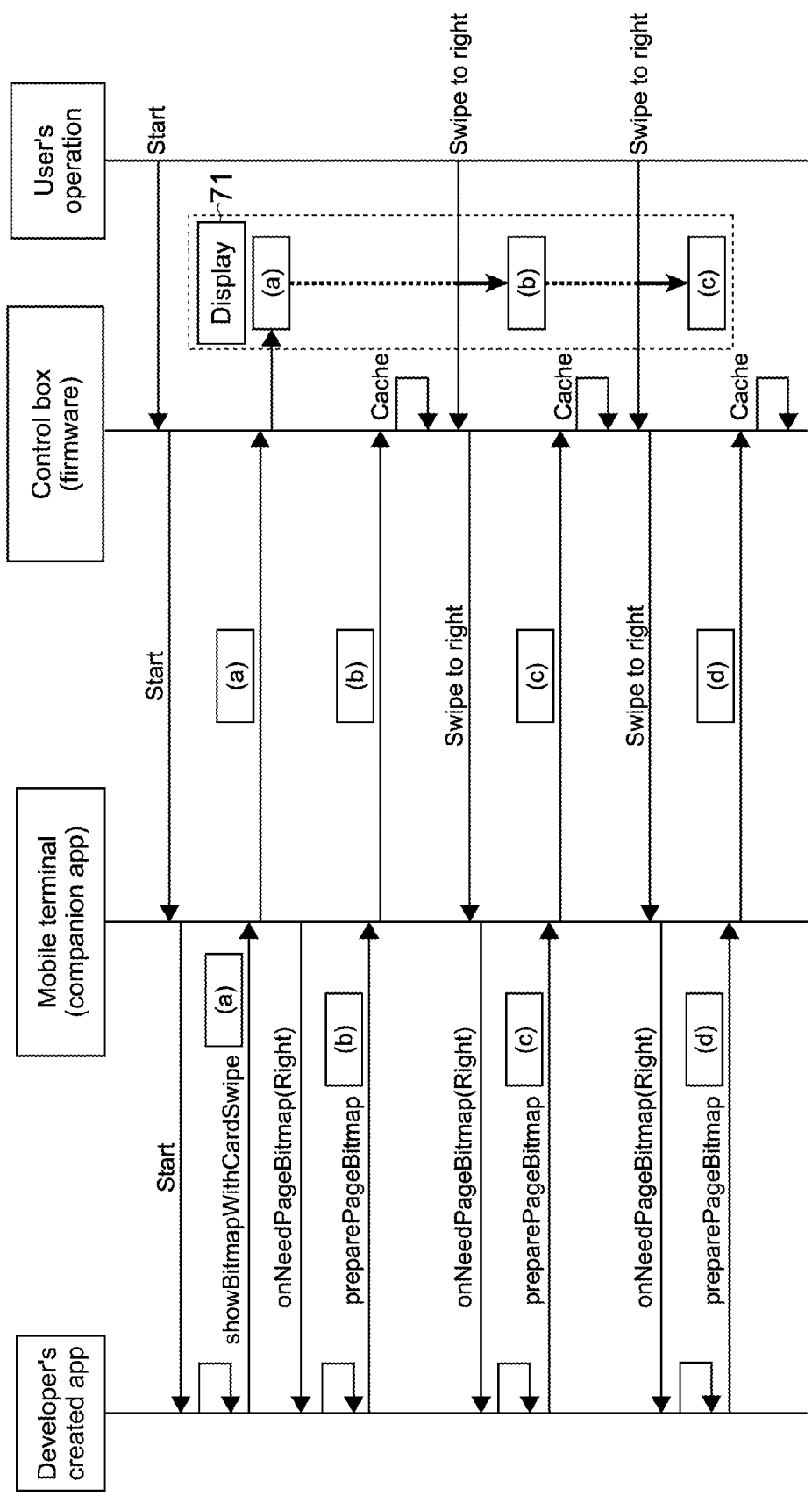
FIG. 19 shows a sequence of a system including a developer's created app, corresponding to the sequence shown in FIG. 17.
Figure 20:
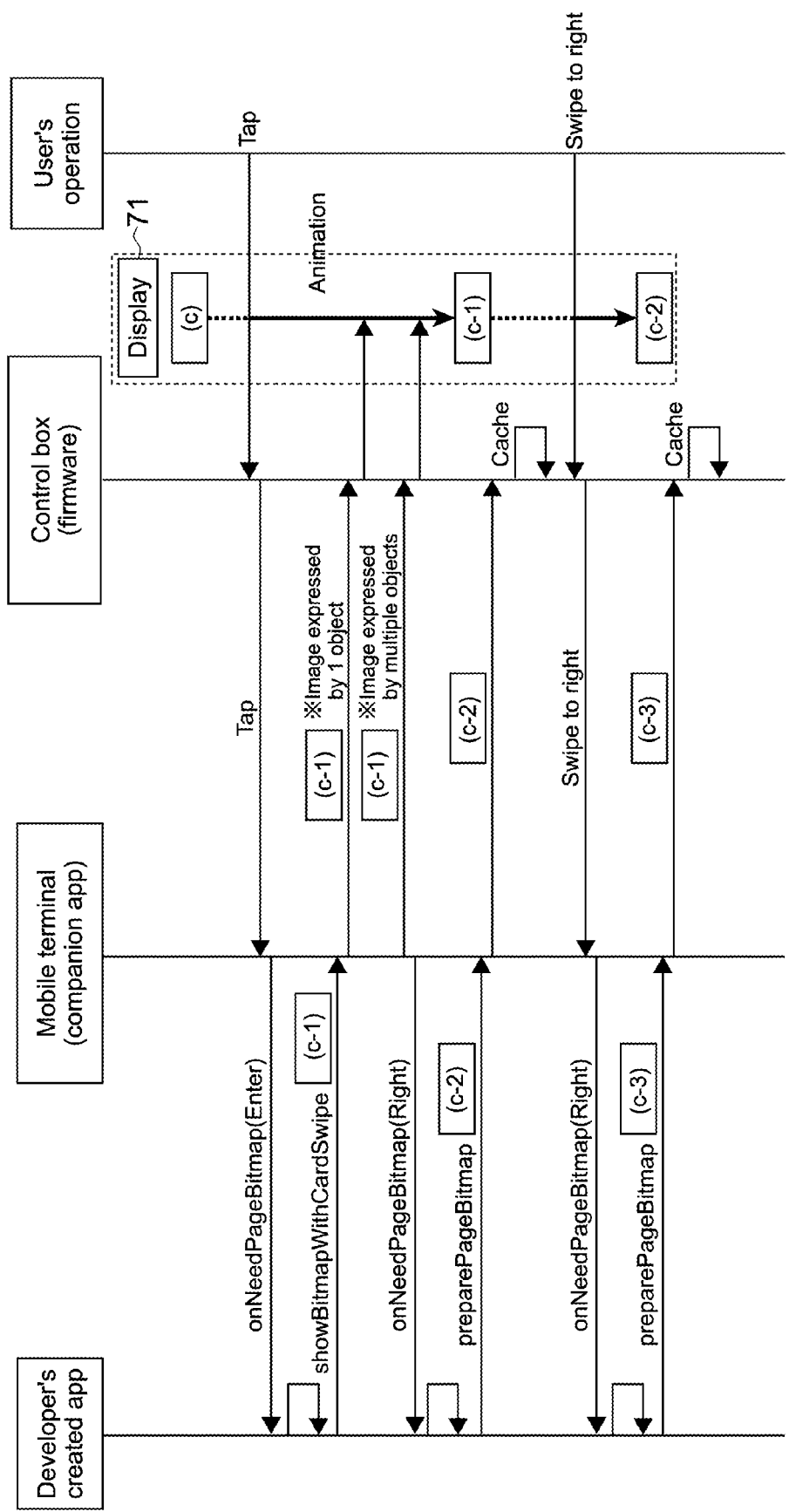
FIG. 20 shows a sequence of a system including a developer's created app, corresponding to the sequence shown in FIG. 18.

FIGS. 19 and 20 show sequences corresponding to the respective sequences shown in FIGS. 17 and 18. FIGS. 19 and 20 are different from FIGS. 17 and 18 in the point that an app (created by the developer) configured to be capable of communicating with the mobile terminal (external apparatus) has been added to the system.

In the sequence of FIG. 19, the steps executed by the companion app 25 shown in FIG. 17, which are steps 103, 106, 111 and 116, are executed by the developer's created app. That is, the developer's created app receives the operation event via the companion app 25 from the firmware 45; and sends the image via the companion app 25 to the firmware 45.

Similarly, in the sequence of FIG. 20, the steps executed by the companion app 25 shown in FIG. 18, which are steps 203, 208 and 213, are executed by the developer's created app.

For example, when going to the upper hierarchy, that is, when moving from the app hierarchy 300 to the card hierarchy 200, "onNeedPageBitmap(Exit)" is requested to the developer's created app at the time when the back key is pressed by the user.

In addition, for example, in cases where the currently displayed image is one at the left end on the coordinate system and there are no other screens on the left side of this image, if the operation of swiping to left is input, the developer's created app may notify the companion app 25 of the absence of the screen (showBitmapWithCardSwipe (NULL image)).

5. Other Various Embodiments

The present disclosure is not limited to the embodiments described above, and various other embodiments may be made.

The wearable device 70 in each of the embodiments has been described to be connected to the control box 50 via wired connection, or in other words, with an electric cable. However, the wearable device may be a highly-functional one in which the wearable device and the control box are integrated together without the electric cable.

In this case, the control box may be a control apparatus of the wearable device which is embedded inside the wearable device. For example, in this case, an operation unit used for operating the wearable device by the user (for example, the touch panel) may also be mounted integrally to the wearable device.

In the embodiments described above, an apparatus which functions as the image processing apparatus was a portable apparatus such as a mobile phone. However, this may be a non-portable apparatus such as a desktop PC.

In the embodiments described above, the control box 50 and the mobile terminal 30 were configured to be communicable with each other. However, it is also possible that the communication involved in the present disclosure is made by the control box 50 (the wearable apparatus side) and the server computer of the cloud system 10, without being mediated by the mobile terminal 30. In this case, the server computer will be the external apparatus with respect to the wearable device.

In the above-described first embodiment, the animation processing was applied to switching of the screen between the card hierarchy 200 and the app hierarchy 300. However, in cases where there is another hierarchy in addition to these hierarchies 200 and 300, the animation processing may also be applied to switching of the screen among those hierarchies.

The animation processing in the above-described embodiments is not limited to the fade-out and fade-in processing. Examples of animation processing to clear the image include one in which the image is shown to be sucked into an arbitrary local region in the screen; and one in which the image is divided in two or more parts and then moved. Examples of animation processing to generate the image include one in which the image wells up from an arbitrary local region in the screen.

In the first embodiment, the processing of switching the images from the card hierarchy to the app hierarchy (between up and down) by the animation has been described. In the second embodiment, the processing of switching the images within the same hierarchy (between right and left) by the animation has been described. For example, as the switching of the images within the same hierarchy has been expressed by the motions to right and left in the second embodiment, it is also possible that the switching of the images between hierarchies (between up and down) may be expressed in such a manner that the images are shown to be moved up and down. By such animation processing, as the direction of the movement of the images can be identified, the user may intuitively understand that the switching of the images between up and down is made, or that the switching between right and left is made.

In the embodiments described above, the animation processing has been applied to both of the first and second images. However, for example, it is also possible that the animation processing is to be applied to either one of the first image and the second image.

Out of the characteristic parts of the embodiments described above, at least two characteristic parts can be combined.

The present disclosure can have the following configurations.

(1) A control apparatus including:
a notification unit configured to notify an external apparatus of an operation event being input;
a display controller configured to, after the external apparatus is notified of the operation event, apply animation processing to a first image displayed on a display of a wearable device, during the time when the external apparatus is generating an image based on the operation event or when the external apparatus is sending the generated image; and
a receiver configured to be capable of receiving a second image sent from the external apparatus, the second image being the image generated by the external apparatus.

(2) The control apparatus according to (1), in which
the display controller is configured to display the second image on the display, the second image being received by the receiver.

(3) The control apparatus according to (2), in which
the display controller is configured to apply the animation processing to the second image.

(4) The control apparatus according to any one of (1) to (3), in which
the display controller is configured to perform fade-out processing with respect to the first image.

(5) The control apparatus according to claim 4), in which
the display controller is configured to, after performing the fade-out processing, perform fade-in processing with respect to the received second image.

(6) The control apparatus according to any one of (2) to (5), in which
the display controller is configured to display a third image on the display, between displaying the first image and displaying the second image.

(7) The control apparatus according to (1), in which
the display controller is configured to, if a plurality of objects to express the second image is to be generated and sent by the external apparatus after the second image is generated by the external apparatus based on the operation event, apply animation processing to the second image, during the time when the plurality of objects is generated or when the plurality of objects is sent.

(8) The control apparatus according to any one of (1) to (7), in which
the display controller is configured to display on the display, as the first image, a first image in application software; and display on the display, as the second image, a second image in the application software which is different from the first image in the application software.

(9) The control apparatus according to any one of (1) to (7), in which
the display controller is configured to display on the display, as the first image, an image in first application software; and display on the display, as the second image, an image in second application software, the second application software being different from the first application software.

(10) The control apparatus according to (1), in which
the external apparatus is
a mobile terminal, or
a server computer in a cloud system.

(11) The control apparatus according to claim 1), in which
the display controller is configured to express a directionality of the first image, as the animation processing.

(12) The control apparatus according to (3), in which
the display controller is configured to express a directionality of the second image, as the animation processing.

(13) An information processing apparatus to be provided in an apparatus configured to communicate with a control apparatus of a wearable device capable of displaying an image, the information processing apparatus including:
a receiver configured to receive an operation event being notified by the control apparatus;
a generation unit configured to generate an image based on the operation event;
a transmission unit configured to send the generated image to the control apparatus; and
an execution unit configured to, after the operation event is issued, execute generating the image by the generation unit or execute sending the generated image by the transmission unit, during the time when the control apparatus is applying animation processing to an image displayed on the wearable device.

(14) A control method including:
displaying a first image on a display of a wearable device;
notifying an external apparatus of an operation event being input;
applying animation processing to the first image displayed on the display, after the external apparatus is notified of the operation event, during the time when the external apparatus is generating a second image based on the operation event or when the external apparatus is sending the second image; and
receiving the second image being generated by and sent from the external apparatus.

(15) An information processing method including:
receiving an operation event being notified by a control apparatus of a wearable device capable of displaying an image;
generating a second image based on the notified operation event, or sending the second image, after the notification of the operation event is made and during the time when the control apparatus is applying animation processing to a first image displayed on the wearable device; and
sending the generated second image to the control apparatus.

(16) An information processing system including:
a control apparatus of a wearable device capable of displaying an image; and an external apparatus capable of communicating with the control apparatus,
the external apparatus including
a receiver configured to receive an operation event being notified by the control apparatus,
a generation unit configured to generate an image based on the received operation event, and
a transmission unit configured to send the generated image to the control apparatus;
the control apparatus including
a notification unit configured to notify the external apparatus of the operation event being input,
a display controller configured to, after the external apparatus is notified of the operation event, apply animation processing to a first image displayed on the wearable device, during the time when the generation unit is generating the image based on the operation event or when the transmission unit is sending the generated image, and
a receiver configured to be capable of receiving a second image sent from the transmission unit, the second image being the image generated by the generation unit.

(17) A wearable device including:
an operation unit configured to receive an operation event being input;
a display configured to display an image;
a notification unit configured to notify an external apparatus of the operation event;
a display controller configured to, after the external apparatus is notified of the operation event, apply animation processing to a first image displayed on the display, during the time when the external apparatus is generating an image based on the operation event or when the external apparatus is sending the generated image; and
a receiver configured to be capable of receiving a second image sent from the external apparatus, the second image being the image generated by the external apparatus.

(18) A control apparatus, including:
a notification unit configured to notify an external apparatus of an operation event being input;
a receiver configured to receive an image sent from the external apparatus;
a storage unit configured to store the received image;
a display controller configured to, based on a coordinate system representing a place to position a plurality of images, allow the external apparatus to display at least one image out of the plurality of images; and
a controller configured to, if a first image is received by the receiver, the first image being sent from the external apparatus in accordance with the notification of the operation event,
display the first image by the display controller and
receive a second image sent from the external apparatus and store the received second image to the storage unit, the second image being adjacent to the first image on the coordinate system or positioned at a predetermined distance from the first image on the coordinate system.

(19) An information processing apparatus to be provided in an apparatus configured to communicate with a control apparatus of a wearable device capable of displaying an image, the information processing apparatus including:
a receiver configured to receive an operation event being notified by the control apparatus, the control apparatus being configured to, based on a coordinate system representing a place to position a plurality of images, allow the wearable device to display at least one image out of the plurality of images;
a transmission unit configured to generate an image and send the generated image to the control apparatus; and
a controller configured to
generate a first image based on the received operation event and send the first image by the transmission unit to the control apparatus, and
send a second image by the transmission unit to the control apparatus, the second image being adjacent to the first image on the coordinate system or positioned at a predetermined distance from the first image on the coordinate system.

(20) The information processing apparatus according to (19), in which
the information processing apparatus has a function as an API (Application Programming Interface).

It should be understood by those skilled in the art that various modifications, combinations, sub-combinations and alterations may occur depending on design requirements and other factors insofar as they are within the scope of the appended claims or the equivalents thereof.

What is claimed is:
1. A control apparatus, comprising:
a processing device and a memory encoded with instructions that, when executed by the processing device, function as:

a notification unit configured to notify an external apparatus of an operation event being input;

a display controller configured to, after the external apparatus is notified of the operation event, apply animation processing to a first image displayed on a display of a wearable device, wherein the animation processing includes generating and displaying, on the wearable device, successive different images based on the first image, during the time when the external apparatus is generating an image based on the operation event or when the external apparatus is sending the generated image and wherein the animation processing includes gradually modifying at least one parameter of the first image over the successive different images; and a receiver configured to receive a second image sent from the external apparatus, the second image being the image generated by the external apparatus.

2. The control apparatus according to claim 1, wherein the display controller is configured to display the second image on the display, the second image being received by the receiver.

3. The control apparatus according to claim 2, wherein the display controller is configured to apply the animation processing to the second image.

4. The control apparatus according to claim 3, wherein the display controller is configured to express a directionality of the second image, as the animation processing.

5. The control apparatus according to claim 2, wherein the display controller is configured to display a third image on the display, between displaying the first image and displaying the second image.

6. The control apparatus according to claim 1, wherein the display controller is configured to perform fade-out processing with respect to the first image.

7. The control apparatus according to claim 6, wherein the display controller is configured to, after performing the fade-out processing, perform fade-in processing with respect to the received second image.

8. The control apparatus according to claim 1, wherein the display controller is configured to, if a plurality of objects to express the second image is to be generated and sent by the external apparatus after the second image is generated by the external apparatus based on the operation event, apply animation processing to the second image, during the time when the plurality of objects is generated or when the plurality of objects is sent.

9. The control apparatus according to claim 1, wherein the display controller is configured to display on the display, as the first image, a first image in application software; and display on the display, as the second image, a second image in the application software which is different from the first image in the application software.

10. The control apparatus according to claim 1, wherein the display controller is configured to display on the display, as the first image, an image in first application software; and display on the display, as the second image, an image in second application software, the second application software being different from the first application software.

11. The control apparatus according to claim 1, wherein the external apparatus is
a mobile terminal, or
a server computer in a cloud system.

12. The control apparatus according to claim 1, wherein the display controller is configured to express a directionality of the first image, as the animation processing.

13. An information processing apparatus to be provided in an apparatus configured to communicate with a control apparatus of a wearable device capable of displaying an image, the information processing apparatus comprising:

a receiver configured to receive an operation event being notified by the control apparatus;

a generation unit configured to generate a second image based on the operation event;

a transmission unit configured to send the second image to the control apparatus; and an execution unit configured to, after the operation event is issued, execute generating the second image by the generation unit or execute sending the second image by the transmission unit, during the time when the control apparatus is applying animation processing to a first image displayed on the wearable device, wherein the animation processing includes generating and displaying, on the wearable device, successive different images based on the first image and wherein the animation processing includes gradually modifying at least one parameter of the first image over the successive different images.

14. A control method comprising:

displaying a first image on a display of a wearable device;

notifying an external apparatus of an operation event being input;

applying animation processing to the first image displayed on the display, after the external apparatus is notified of the operation event, wherein the animation processing includes generating and displaying, on the wearable device, successive different images based on the first image, during the time when the external apparatus is generating a second image based on the operation event or when the external apparatus is sending the second image and wherein the animation processing includes gradually modifying at least one parameter of the first image over the successive different images; and receiving the second image being generated by and sent from the external apparatus.

15. An information processing method comprising:

receiving an operation event being notified by a control apparatus of a wearable device capable of displaying an image;

generating a second image based on the notified operation event, or sending the second image, after the notification of the operation event is made and during the time when the control apparatus is applying animation processing to a first image displayed on the wearable device, wherein the animation processing includes generating and displaying, on the wearable device, successive different images based on the first image and wherein the animation processing includes gradually modifying at least one parameter of the first image over the successive different images; and sending the generated second image to the control apparatus.

16. An information processing system comprising:

a control apparatus of a wearable device capable of displaying an image; and an external apparatus capable of communicating with the control apparatus, the external apparatus including
a receiver configured to receive an operation event being notified by the control apparatus, a generation unit configured to generate a second image based on the received operation event, and a transmission unit configured to send the second image to the control apparatus;

the control apparatus including a notification unit configured to notify the external apparatus of the operation event being input, a display controller configured to, after the external apparatus is notified of the operation event, apply animation processing to a first image displayed on the wearable device, wherein the animation processing includes generating and displaying, on the wearable device, successive different images based on the first image, during the time when the generation unit is generating the second image based on the operation event or when the transmission unit is sending the second image and wherein the animation processing includes gradually modifying at least one parameter of the first image over the successive different images, and a receiver configured to receive the second image sent from the transmission unit, the second image being the image generated by the generation unit.

17. A wearable device comprising:

an operation unit configured to receive an operation event being input;

a display configured to display an image;

a notification unit configured to notify an external apparatus of the operation event;

a display controller configured to, after the external apparatus is notified of the operation event, apply animation processing to a first image displayed on the display, wherein the animation processing includes generating and displaying, on the wearable device, successive different images based on the first image, during the time when the external apparatus is generating a second image based on the operation event or when the external apparatus is sending the second image and wherein the animation processing includes gradually modifying at least one parameter of the first image over the successive different images; and a receiver configured to receive the second image sent from the external apparatus, the second image being the image generated by the external apparatus.

18. A control apparatus, comprising:

a notification unit configured to notify an external apparatus of an operation event being input;

a receiver configured to receive an image sent from the external apparatus;

a storage unit configured to store the received image;

a display controller configured to, based on a coordinate system representing a place to position a plurality of images, allow the external apparatus to display at least one image out of the plurality of images; and a controller configured to, if a first image is received by the receiver, the first image being sent from the external apparatus in accordance with the notification of the operation event, display the first image by the display controller and receive a second image sent from the external apparatus and store the received second image to the storage unit, the second image being adjacent to the first image on the coordinate system or positioned at a predetermined distance from the first image on the coordinate system.

19. An information processing apparatus to be provided in an apparatus configured to communicate with a control apparatus of a wearable device capable of displaying an image, the information processing apparatus comprising:

a receiver configured to receive an operation event being notified by the control apparatus, the control apparatus being configured to, based on a coordinate system representing a place to position a plurality of images, allow the wearable device to display at least one image out of the plurality of images;

a transmission unit configured to generate an image and send the generated image to the control apparatus; and a controller configured to generate a first image based on the received operation event and send the first image by the transmission unit to the control apparatus, and send a second image by the transmission unit to the control apparatus, the second image being adjacent to the first image on the coordinate system or positioned at a predetermined distance from the first image on the coordinate system.

20. The information processing apparatus according to claim 19, wherein the information processing apparatus has a function as an API (Application Programming Interface).

* * * * *